(12) United States Patent
Tomizawa et al.

(10) Patent No.: US 6,202,082 B1
(45) Date of Patent: Mar. 13, 2001

(54) TRUNK TRANSMISSION NETWORK

(75) Inventors: Masahito Tomizawa, Yokohama; Shinji Matsuoka, Yokosuka; Yoshihiko Uematsu, Tokyo, all of (JP)

(73) Assignee: Nippon Telegraph and Telephone Corporation, Tokyo (JP)

( * ) Notice: Under 35 U.S.C. 154(b), the term of this patent shall be extended for 0 days.

(21) Appl. No.: 08/918,103

(22) Filed: Aug. 27, 1997

(30) Foreign Application Priority Data

Aug. 27, 1996 (JP) .................................................... 8-225492
Sep. 2, 1996 (JP) .................................................... 8-232169
Dec. 6, 1996 (JP) .................................................... 8-326944

(51) Int. Cl.$^7$ .................................................. H04L 12/42

(52) U.S. Cl. ........................ 709/201; 709/238; 709/239; 709/240; 709/242; 709/251; 370/469; 370/389; 370/85.5

(58) Field of Search ................................. 709/201, 238, 709/239, 240, 251, 242; 370/469, 389, 85.5

(56) References Cited

U.S. PATENT DOCUMENTS

| | | | |
|---|---|---|---|
| 5,323,394 | 6/1994 | Perlman | 370/250 |
| 5,457,678 | 10/1995 | Goeldner | 370/395 |
| 5,506,838 | 4/1996 | Flanagan | 370/258 |

FOREIGN PATENT DOCUMENTS

| | | |
|---|---|---|
| 0 464 680 | 1/1992 | (EP) . |
| 3-217140 | 9/1991 | (JP) . |
| 3-276937 | 12/1991 | (JP) . |
| 7-058765 | 3/1995 | (JP) . |
| 8-023200 | 1/1996 | (JP) . |
| 8-191318 | 7/1996 | (JP) . |

OTHER PUBLICATIONS

M. Tomizawa et al. "Bandwidth Arrangement & Self–Healing Algorithm for Logical MeshConnected Multi–gigabit Networks" vol. 3; p. 13–32, 1995.*

Cohen et al. "A new protocol for Route Discovery in Multi–Ring Networks: Part I—the basic protocol," IEEE Trans. Comm, vol. 24, No. 2/3/4, pp. 488–498.*

Matsuoka S et al.: "Classified Path Restoration Scheme with Hitless Protection Switching for Large–Capacity Trunk Transmission Networks" Globecom '95. IEEE Global Telecommunications Conference, Singapore, Nov. 14–16, 1995, vol. 2, Nov. 14, 1995 (1995–11–14), pp. 941–945, XP000622932 Institute of Electrical and Electronics Engineers * abstract ** parts I, IV and V*.

Rom R et al: "A Combined Fast–Routing and Bandwidth–Reservation Algorithm for ATM Networks" Broadband Communications. Global Infrastructure for the Information Age, Proceedings of the International IFIP–IEEE Conference on Broadband Communications, Canada, 1996, Apr. 1, 1996 (1996–04–01), pp. 76–87, XP000702570* abstract ** parts 2,3,5,6*.

(List continued on next page.)

Primary Examiner—Moustafa M. Meky
Assistant Examiner—Hien C. Le
(74) Attorney, Agent, or Firm—Pillsbury Madison & Sutro LLP

(57) ABSTRACT

In a trunk transmission network for transmitting information signals between nodes via paths, flexible path operation is achieved by setting up paths between source nodes and destination nodes after pre-classifying paths into a higher service class in which any loss of information occurring in that path is restored, and a lower service class which permits loss of information to occur in the path. The flexible operation is further achieved by arranging for each node, when it acts as a source node, to recognize the service class of the information signal it is sending to a destination node, and to select a path corresponding to that service class.

17 Claims, 26 Drawing Sheets

OTHER PUBLICATIONS

Soha M et al: "Comparison of Source Routing and Spanning Tree Bridges. Comparison of Two Lan Bridge Approaches" IEEE Network: The Magazine of Computer Communications, vol. 2, No. 1, Jan. 1, 1988 (1988–01–01), pp. 37–43, XP000619282 ISSN: 0890–8044 * p. 37–p. 38, col. 1, line 3*.

Hiroaki Komine: "A Distributed Restoration Algorithm for Multiple–Link and Node Failures of Transport Networks" Communications: Connecting the Future, San Diego, Dec. 2–5, 1990, vol. 1, Dec. 2, 1990 (1990–12–02), pp. 459–463, XP000218771 Institute of Electrical and Electronics Engineers ISBN: 0–87942–632–2 *abstract ** part 3*.

Tomizawa M et al.: "Distributed–Controlled Multiple–Ring Networks with Classified Path Restoration" IEICE Transactions on Communications, vol. E80–B, No. 7, Jul. 1, 1997 (1997–07–01), pp. 1000–1007, XP000721695.

* cited by examiner

| FC | D-ID | S-ID | C | Grade | C/CC | Path Capacity | Intermediate Node Area | Bridge (Drop) ID | Bridge/Drop | FCS |
|---|---|---|---|---|---|---|---|---|---|---|

Date Field spans from Grade through Bridge/Drop.

FIG.15

TRUNK TRANSMISSION NETWORK

CROSS REFERENCE TO RELATED APPLICATIONS

This application is based on and claims priority from Japanese Application No. 8-225492 filed Aug. 27, 1996, No. 8-237169 filed Sep. 2, 1996, and No. 8-326944 filed Dec. 6, 1996, the contents of each of which is incorporated hereinto by reference.

BACKGROUND OF THE INVENTION

1. Field of the Invention

The present invention can be utilized for trunk transmission systems in which communication involves setting up paths semi-permanently on physical transmission lines, and it is suited for use in synchronous digital hierarchy (SDH) networks. A path is defined as a single and direct connection between a node-pair, for example, concatenated Virtual Container (VC) in SDH format, and may include Virtual Paths (VPs) having the same source-destination nodes in the trunk network.

2. Description of Related Art

In recent years, ultrahigh-speed trunk transmission networks that utilize the broadband nature of optical fiber have been introduced. In particular, as disclosed, a 10 Gbit/s transmission system has been introduced in trunk network links, as disclosed in:

Ref.1: Y. Kobayashi, Y. Sato, K. Aida, K. Hagimoto and K. Nakagawa, "SDH-Based 10 Gbit/s Optical Transmission System", Proc. IEEE GLOBECOM 94 (San Francisco, Calif.), pp.1166–1170, 1994

Meanwhile, asynchronous transfer mode (ATM), which supports diverse services, has been recommended by the ITU-T and the ATM Forum as the signal processing scheme for network nodes. In the ATM layer, which is positioned between the physical layer and the application layer, signals are processed in cell units. However, problems are encountered if the processing of signals carried in trunk network links at speeds in excess of 10 Gbit/s is carried out entirely in cell units. As many as several thousand virtual paths (VPs) have to be processed at each node, which means that large-scale node circuitry and more complex network management is required, as disclosed in:

Ref.2: S. Matsuoka, N. Kawase, Y. Yamabayashi and Y. Kobayashi, "Classified Path Restoration Scheme With Hitless Protection Switching for Large-Capacity Trunk Transmission Networks", IEEE GLOBECOM 95, p.941–945, 1995

Given this situation, the present inventors have that although the signal processing employed in the ATM layer can be utilized for service nodes, trunk network node processing functions such as path setup and restoration will be carried out in large-capacity direct-connected path units at the physical layer. These large-capacity direct-connected paths can have a variety of capacities, and the management of path networks can be simplified by processing in large-capacity direct-connected path units. It is also considered that time division multiplexing (TDM) will be used at the physical layer for multiplexing. In the present specification, it will generally be assumed that Synchronous Digital Hierarchy (SDH) is being used.

Meanwhile, high reliability and survivability are required in networks with ultrahigh-capacity links, as disclosed in:

Ref.3: T.-H. Wu, "Fibre Network Service Survivability", Artech House, Boston and London, 1992

In an ultrahigh-speed network, a failure in one fiber can have adverse effects on several thousands of users.

Self-healing functions are therefore being studied and introduced. Self-healing is a high-speed restoration function for network failures, and the best-known example to have been introduced is the SONET (Synchronous Optical Network) ring network in which path or line switches are provided. A self-healing ring network has the advantages of simpler equipment configuration and higher reliability. Problems of delay and the like mean that a multiple-ring configuration combining a plurality of rings is a promising approach to the design of trunk networks. However, a multiple-ring network with a self-healing function has not yet been achieved, and path setup functions such as routing and slot allocation have not yet been perfected.

Network supervision and control will now be explained. The TMN (Telecommunication Management Network) model has been standardized, and its architecture is shown in FIG. 1. In this architecture, a network element NE provided at each node is connected to a packet transfer network DCN (data communication network) via a message converter module MCM (or a mediation device MD, not shown), and an operating system OpS is connected to this packet transfer network DCN. FIG. 1 also shows a workstation WS for using operating system OpS. Each network element NE has a control section which exchanges control signals with the operating system OpS, and transfers supervisory and control information to the OpS, via the message converter module MCM (or a mediation device MD) and the packet network DCN.

However, as transmission link-capacity of the networks becomes larger, the cost of the operating system OpS in the model shown in FIG. 1, and in particular software development cost, becomes higher than that of the network elements NE, thus raising overall network costs. Moreover, with a centralized control network of the sort shown in the FIG. 1, if the system goes down at the control node, this leads to the entire network going down.

Distributed control has therefore been much studied. In distributed control, network control is performed in distributed fashion at each network node. FIG. 2 shows a distributed management network architecture in a single-ring network. With this architecture, a small-scale operating system OpS is provided at each network element NE. Distributed control of this sort is disclosed in, for example:

Ref.4: I. Cidon, I. Gopal, M. Kaplan and S. Kutten, "A Distributed Control Architecture of High-Speed Networks", IEEE Transactions on Communications, Vol.43, No.5, pp.1950–1960, 1995

A distributed control network requires only a small-scale operating system provided in each network element, and gives higher reliability in relation to node failure than a centralized control network with several control nodes, as disclosed in:

Ref.5: A. E. Baratz, J. P. Gray, P. E. Green, Jr., J. M. Jaffe and D. P. Pozefsky, "SNA Networks of Small Systems", IEEE Journal on Selected Areas in Communications, Vol.SAC-3, No.3, pp.416–426, 1985

Further advantages are that a separate control network such as DCN is not needed, the network database memory held by each node can be reduced in size, and faster control is possible.

It is anticipated that in the future there will be many different kinds of multimedia services and that each kind will require different signal quality or reliability. Trunk networks will therefore have to operate and administrate multiplexed paths for each service in accordance with a diverse range of quality requirements, and do so at low cost.

However, conventional network technology handles the quality and reliability of all paths in the same manner. Consequently, the quality and reliability of a network has previously been dictated by the path which has the highest requirements, with the result that overall network cost has been high. An approach which was studied as a way of overcoming this problem, namely, to provide for different QoS (Quality of Service) classes by means of a logically configured virtual channel handler (VCH) interconnection network layer rather than at the VP layer, is described in:

Ref.6: E. Oki and N. Yamanaka, "An Optimum Logical-Design Scheme for Flexible Multi-QoS ATM Networks Guaranteeing Reliability", IEICE Trans. Commun., E78-B, No.7, pp.1016–1024, 1995

However, this proposed scheme still required a high-quality VP network and lacked flexibility at the path operating level.

It is considered that future multimedia networks will require flexibility at the path level as well. In other words, such networks will simultaneously contain paths where high cost is acceptable but loss of even a single bit is not acceptable, and other paths where some deterioration of quality or reliability is acceptable but cost should be kept low.

It is an object of the present invention to provide a solution to this problem and to achieve flexibility of path operation. It is a further object of the present invention to provide a concrete implementation, in a multiple-ring architecture under a distributed control environment, of the operation of paths that have been classified in accordance with their self-healing survivability.

SUMMARY OF THE INVENTION

The present invention provides a trunk transmission network having a plurality of nodes connected via physical transmission lines, wherein a plurality of paths for transmitting information signals are set up on these physical transmission lines among the plurality of nodes. For information signal being transmitted from one of the plurality of nodes (a source node) to another of the plurality of nodes (a destination node), each path connects the source node and the destination node either directly or via other nodes. This trunk transmission network is characterized in that paths between source and destination node pairs are set up on the basis of a pre-classification into higher service class paths in which any loss of information occurring in the path is restored, and lower service class paths in which loss of information in the path is permitted. Each node includes means which, when that node is a source node, recognizes the service class of the information signal to be sent to the destination node and selects a path corresponding to this service class.

The higher service class is preferably further divided into a highest class (hereinafter class A) and a middle class (hereinafter class B). Class A paths employ complete diversity routing: namely, a plurality of different routes are set up for each class A path. Class B paths can be re-routed around the location of a failure when a failure has occurred in a portion of the route traversed by the path. The lowest service class path (hereinafter class C) is preferably a path which is not alternatively routed when a failure has occurred on the path.

By dividing paths between nodes of interest into three classes according to their restoration performance in the event of a failure, the transport functions required by service nodes can be secured at the path level without configuring redundant sections, thereby providing a trunk transmission network that can economize on transmission facilities. Furthermore, by managing the network using just three types of large-capacity paths, the number of paths that have to be managed in the network can be reduced, and hence the burden on the operating system can be eased.

Each of at least some of the plurality of nodes preferably has a distributed path setup means which sets up paths prior to transmission of an information signal by using a control channel to exchange control signals with other nodes. In this case, the distributed path setup means selects a route, in accordance with the required service class, from among the plurality of routes which can connect the source and destination nodes, and then sets up a path along the selected route. Path setup methods can be broadly divided into two types. In the first type, a node which wishes to transmit data takes itself as the source node and provisionally determines routes on the basis of network configuration information given in a manual. It then secures bandwidth by sending a control signal to all the nodes on the route up to the target receiving node. In the second type of path setup method, a source node uses a token protocol to send a packet to a destination node, and any intermediate nodes place a stamp in the packet indicative of whether or not the required bandwidth can be secured. This procedure enables the route to be determined and the necessary bandwidth to be secured.

The physical transmission lines are in the form of a plurality of ring networks connected together, each ring network comprising two or more nodes connected in a ring. Each ring network is connected to another ring network by means of some of the network nodes acting as bridge nodes. The distributed path setup means preferably includes means which, for a class A path, sets up two paths in mutually opposite directions, i.e., clockwise or counterclockwise, around each ring network through which the class A path passes, and which, for a class B path and a class C path, sets up a path in one direction around each ring network.

By restricting a trunk transmission network to a ring topology, setting the direction of routes is restricted to either clockwise or counter-clockwise, routing in the normal state and re-routing for path restoration, etc. after a failure can be simplified, the hardware and algorithms required for route compilation can be reduced in scale, and an economical trunk transmission network can be obtained. In addition, by arranging a plurality of ring networks in a plane and connecting these ring networks to each other using two or more nodes, high reliability, survivability and economy can be secured for large-scale trunk transmission networks, and at the same time expandability can be improved.

If the second of the methods described above is utilized for path setup, a token ring protocol constructed on a data communication channel (DCC) in the section overhead (SOH) embedded in the signal is preferably used for communication between nodes and for securing bandwidth, these functions being required for route determination under distributed control.

In other words, the means for path setup preferably comprises means which, when the node in question is a source node, gets a token which is circulating around the ring network to which that node belongs, and then sends path setup request packets in two mutually opposite directions; means which, when the node in question is a bridge node, transfers a path setup request packet that has arrived in one direction to the next ring network in the same direction; and means which, when the node in question is a destination node and the packets received from the two directions request setup of a class A path, sends back a response to these packets in two mutually opposite directions, and when the packets received from the two directions request setup of a class B or a class C path, sends back a response to one of these packets in one direction only.

For self-healing, each node preferably has means for hitlessly selecting the better quality route of the class A path including two routes for which that node is the destination node. The path setup means preferably also includes means for automatically restoring a class B path by re-routing in the event of a failure. This restoration means preferably includes means which utilizes the second setup method described above to loop back a token contained in the aforementioned control channel when a node has detected a failure in an adjacent link or node.

In other words, three classes of paths, namely class A, class B and class C are provided, and these offer three levels of reliability in terms of path restoration performance. Class A paths are accommodated by two different routes obtained by route-bifurcation at the source node, and these two routes are hitlessly switched at the destination node, with the result that when a failure occurs a class A path can be restored without the loss of even a single bit of information. A detailed description of hitless switching is given in:

Ref.7: N. Kawase, et al., "Hitless Frame Switching Scheme for SDH Networks", Trans. IEICE B-I (in Japanese), Vol.J78-B-I, No.12, pp.764–772, 1995

Class B paths, which have the next highest reliability, are restored by re-setup of the path by means of the same method as used for the original path setup. In the case of a class C path, the signal is not reconnected until maintenance of physical equipment has been completed. Apart from class B paths, the mechanism of self-healing is approximately the same as the one disclosed in Ref.2.

Each ring network is connected to another ring network via two or more bridge nodes. At least one node of any of the ring networks includes means for transmitting, in one direction (i.e., clockwise or counter-clockwise) of the ring network to which that node belongs, a node information collecting packet for collecting information relating to the arrangement and operating state of the nodes in that ring network and in the other ring networks, and means which terminates a node information collecting packet which has returned to the node which originally transmitted it, and which stores the information collected by that packet. Each node of each ring network includes means which writes its node ID and states in a received node information collecting packet and transfers the packet to the next node. Each node used as a bridge node includes, in addition to this node information collecting packet writing and transfer means, means for temporarily storing a node information collecting packet received from one of the two ring networks mutually connected by the bridge node in question; means which, when a right to transmit to the other of the two ring networks has been received, transfers to this other ring network the node information collecting packet stored in the aforementioned temporary storage means; means which deletes the node information collecting packet stored in the temporary storage means if no transmitting right has been obtained and a node information collecting packet from another bridge node has been received; and means for terminating a node information collecting packet which has returned to the bridge node which originally transferred it, and for write inhibiting that packet and returning it to the original ring network.

Each node and bridge node preferably includes means which, if it receives the same node information collecting packet within a predefined time, deletes this packet. A source node preferably also has means which distributes, to at least the bridge nodes of the plurality of ring networks, and if required to each node, the information collected by a node information collecting packet. Each bridge node preferably includes means which, on the basis of the information distributed from this distributing means, places a restriction on the setup of paths via that bridge node.

The inventions of Japanese Laid-Open Patent Applications Hei-3-276937 and Hei-3-217140 disclose providing differences in path priority. According to the former, the quality of a high priority path is guaranteed by sacrificing a healthy low priority path in the event of a failure in the high priority path. As opposed to this, in the present invention, both high priority paths and low priority paths include alternative paths and are set up in advance, and the setup of these paths is not changed when there is a failure. Accordingly, a low priority path is never sacrificed for a high priority path. Furthermore, Japanese Laid-Open Patent Application Hei-3-276937 discloses shared switching being carried out for purposes of path restoration, but there is no route duplication as in the highest class paths in the present invention. Japanese Laid-Open Patent Application Hei-3-276937 also discloses master nodes which perform centralized control. As opposed to this, the present invention performs distributed control.

Japanese Laid-Open Patent Application Hei-3-217140 relates to packet networks in which data transmission takes place only when data has been generated. Furthermore, it allocates one of two transmission paths to urgent data, but does not provide degrees of priority for data transfer when a failure has occurred. Moreover, master nodes perform centralized control of the data transmission paths. The present invention is entirely different from this.

BRIEF DESCRIPTION OF THE DRAWINGS

Other objects and advantages of this invention will become apparent from the detailed description of the preferred embodiments in conjunction with the drawings, in which:

FIG. 15 shows the frame format for a token ring.

DETAILED DESCRIPTION OF THE PREFERRED EMBODIMENTS

Figure 3:
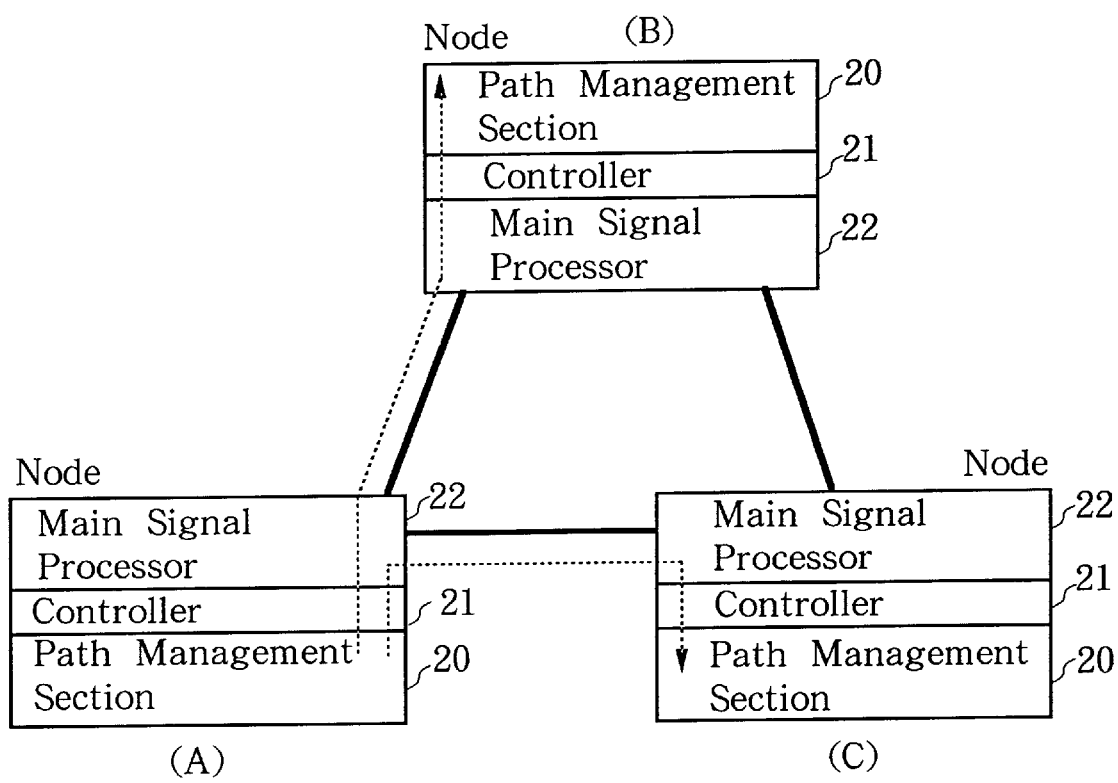
FIG. 3 is a conceptual diagram of a trunk transmission-network according to a first embodiment of the present invention.
Figure 4:
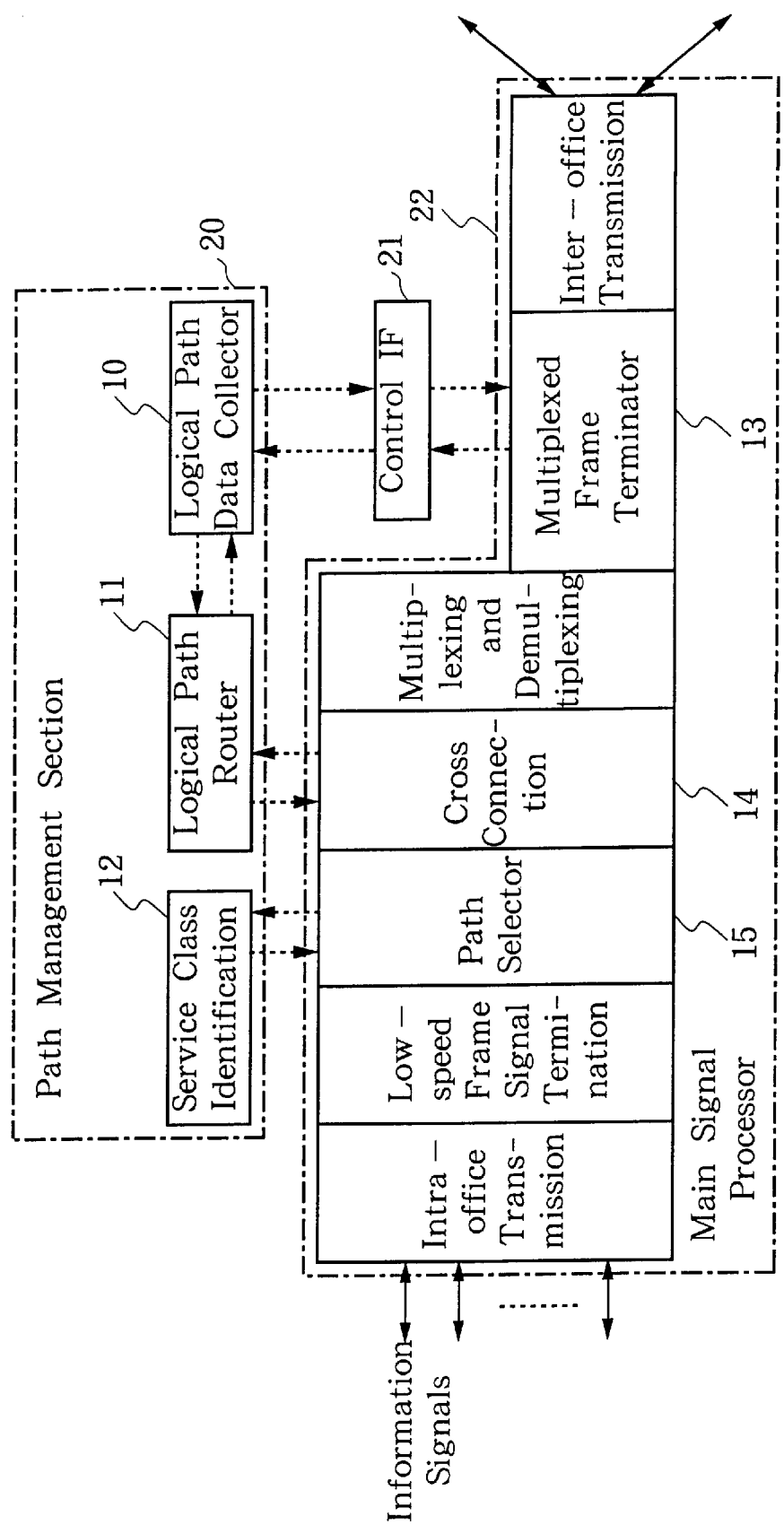
FIG. 4 is a block diagram of a node.

FIG. 3 and FIG. 4 show a first embodiment of the present invention, with FIG. 3 being a conceptual diagram of a trunk transmission network and FIG. 4 being a block diagram of a node.

The FIG. 3 trunk transmission network contains nodes A to C and physical transmission lines connecting these nodes A to C. A path for transmitting information signals from a source node to a destination node is set up via nodes A to C and these physical transmission lines, both the source node and the destination node being one of nodes A to C.

A plurality of paths of different transmission quality are established in advance from the source node to the destination node by means of multiplexed frame terminator 13 (FIG. 4), control interface 21, path data collector 10, path router 11 and cross connection 14. The information signal contains a service class identifier ID, and the source node uses service class identification 12 to recognize this identifier, and path selector 15 to select one of the plurality of paths in accordance with this service class.

There are three service classes. Class A transmits information after setting up two routes. Under normal conditions, class B transmits information by means of one route, but when a failure has occurred in this route, it transmits information after setting up a route which detours around the location of the failure. Class C transmits information by means of one route and does nothing to make up for information loss due to occurrence of a failure.

Figure 5:
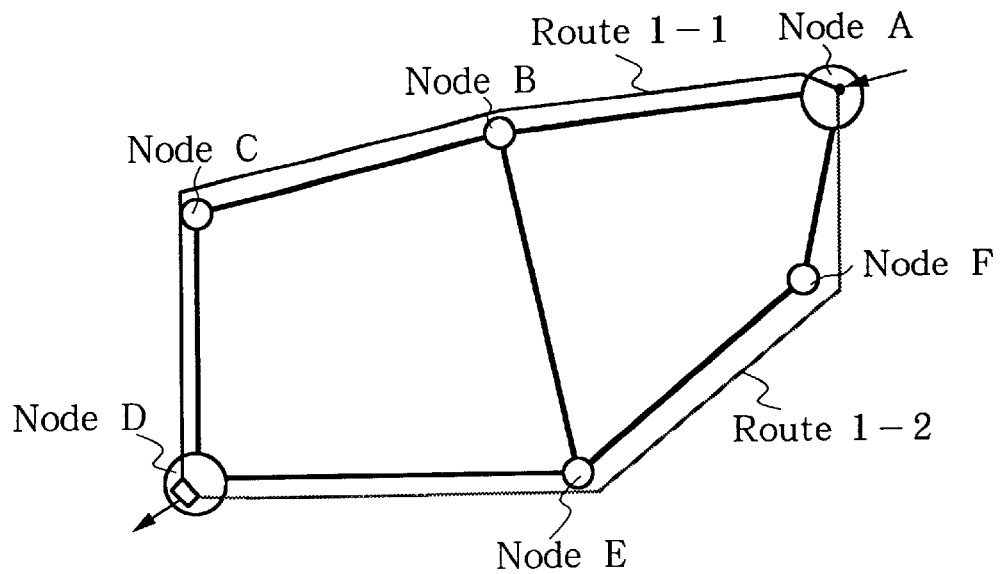
FIG. 5 shows the routing of a class A path.
Figure 6:
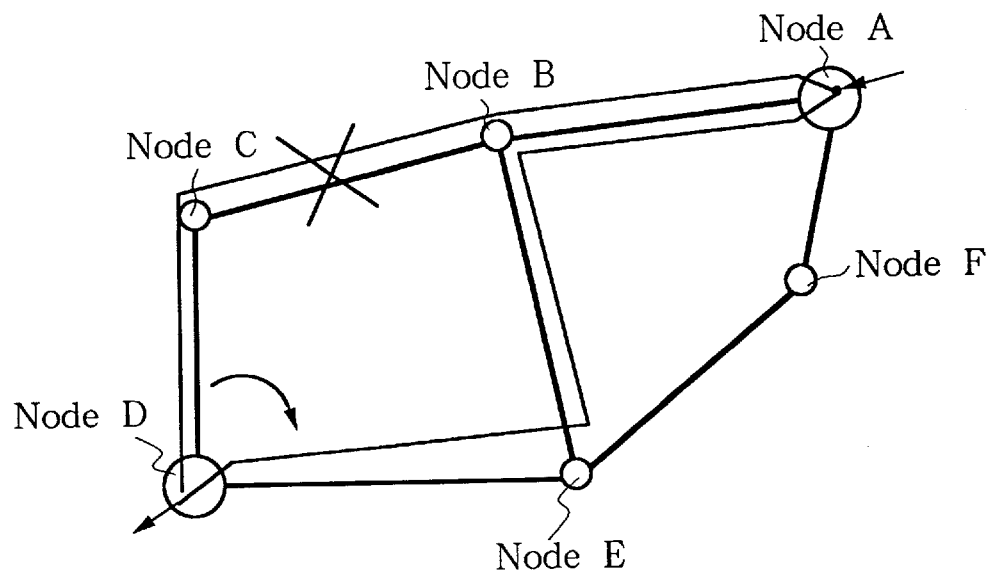
FIG. 6 shows the routing of a class B path.
Figure 7:
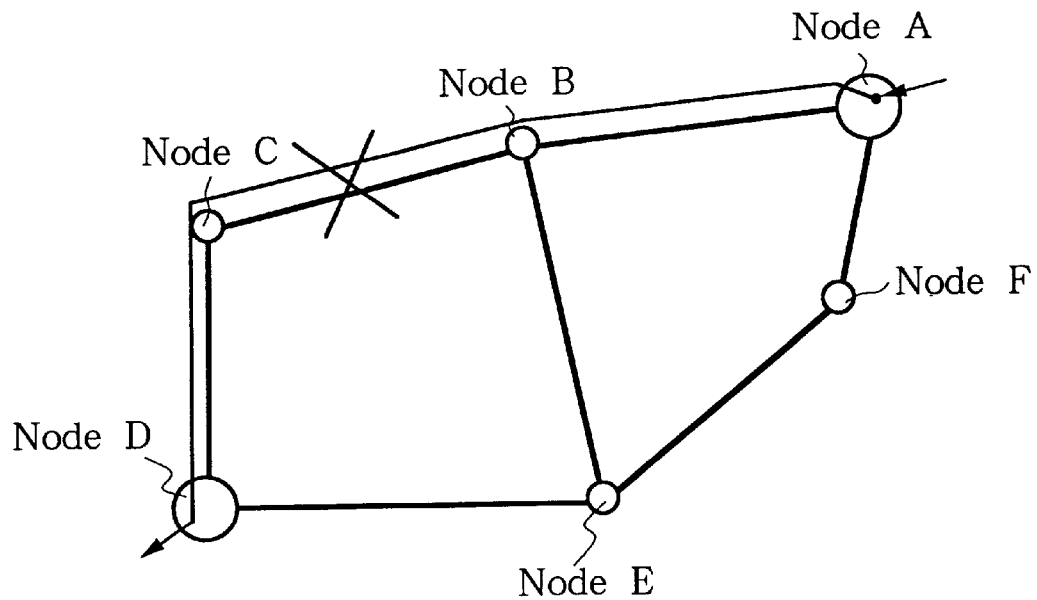
FIG. 7 shows the routing of a class C path.

Next, the operation of this embodiment will be explained with reference to FIG. 5 to FIG. 7. FIG. 5 shows the routing of a class A path, FIG. 6 shows the routing of a class B path, and FIG. 7 shows the routing of a class C path. FIG. 5 shows the routing of a class A path from node A to node D. At source node A, after the information to be transmitted has been split into two, it is transmitted by means of route 1-1 and route 1-2, in which the transmission directions are respectively counter-clockwise via node B and node C, and clockwise via node F and node E. The destination node detects a failure on the basis of the state of the transmission in route 1-1 and route 1-2, and selects the information in the route that is normal. Several methods have previously been considered for implementing hitless switching using this complete diversity routing. However, the use of hitless switching based on parity detection as disclosed in the aforementioned Ref.7 results not only in hitless switching when a transmission line failure has occurred, but also in a high quality path with improved transmission error rate in normal operation, so this method is considered to be optimum.

FIG. 6 shows the routing of a class B path. Under normal operating conditions, a complete diversity routing configuration as in a class A path is not adopted for this path. However, when a failure occurs, a search is made for a route which detours around the failed section and the path is restored by changing to this other route.

FIG. 7 shows the routing of a class C path. For this path, the complete diversity routing configuration of the sort employed for a class A path is not adopted, nor is a search made for an alternative route when a failure occurs, as in the case of a class B path. Consequently, the path is restored by repairing the failed equipment, for example the physical transmission line, the transmission equipment, and so forth. By thus providing paths with different self-healing levels, it is possible to construct a trunk transmission network in which important information can always reach its destination, and in which information where the chief consideration is economy can easily be transmitted cheaply.

As shown in FIG. 5 to FIG. 7, the transmission of information from node A to node D requires just three paths, namely, the class A, class B and class C paths described above. Administration of a trunk transmission network in which the number of nodes is assumed to be N therefore requires management of a maximum of 3 N(N−1)/2 paths.

Figure 8:
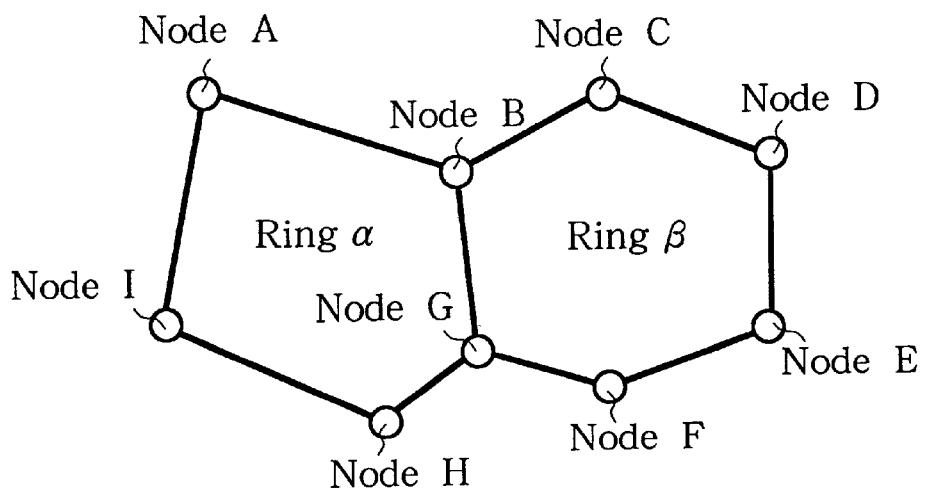
FIG. 8 shows an arrangement of nodes.

FIG. 8 shows an arrangement of nodes. Ring networks generally have the advantages of good survivability and the ability to provide simpler routing than other topologies. In this specification, trunk transmission networks having a plurality of rings will be discussed. This is because a plurality of rings is required when a large-scale trunk transmission network to cover an entire country is to be constructed on the basis of rings. FIG. 8 shows the fundamental node arrangement, in which ring α and ring β are connected by the two nodes B and G. A node that connects rings in this way is called a bridge node. Two bridge nodes are used not only because this makes it possible to restore a path by detouring around a failed link when a single-link failure has occurred in a trunk transmission network, but also because it makes it possible to restore information (i.e., a path) between any two nodes (other than the failed node) in the event of a node failure. By using a configuration of this sort it is also possible to configure a route which implements a class A path between any two nodes, i.e., two diversity-routed routes that do not intersect at any intermediate node. Moreover, because each node has from two to three adjacent nodes, only a restricted number of routes have to be set up at a given node, and therefore it is possible use a simple algorithm to route a path in the normal state or to re-route a path in the event of a failure. Note that the link between node B and node G in FIG. 8 is shared by ring α and ring β.

Figure 9:
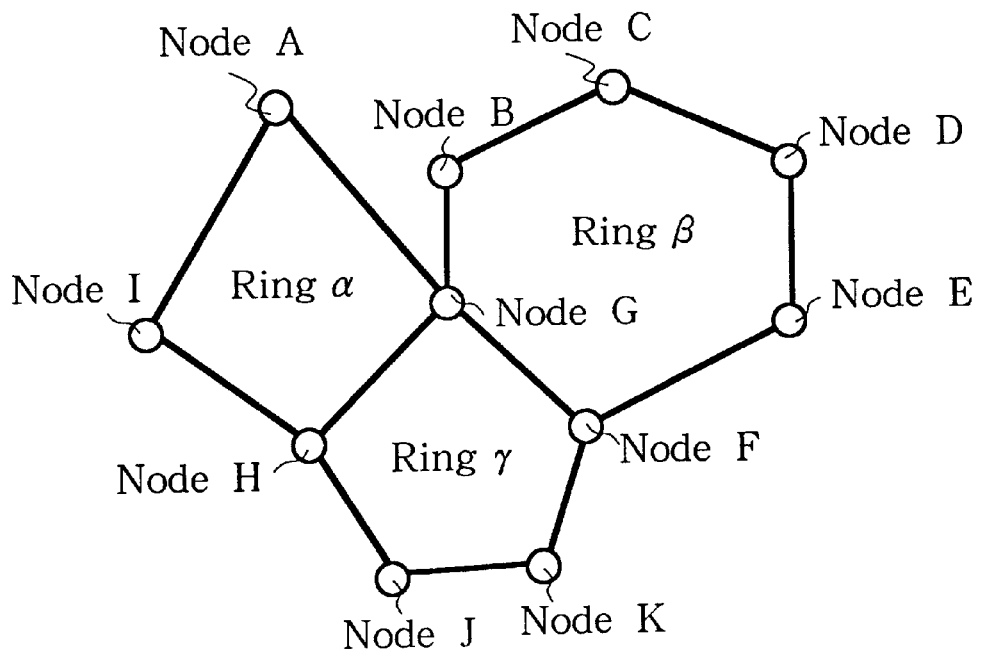
FIG. 9 shows another arrangement of nodes.

FIG. 9 is another arrangement of nodes, showing an example in which the nodes have been extended and the number of rings has been increased to three. Here it is essential to connect adjacent rings by means of two nodes, and ring α is connected to ring γ by nodes G and H, while ring β is connected to ring γ by nodes F and G.

Figure 1:
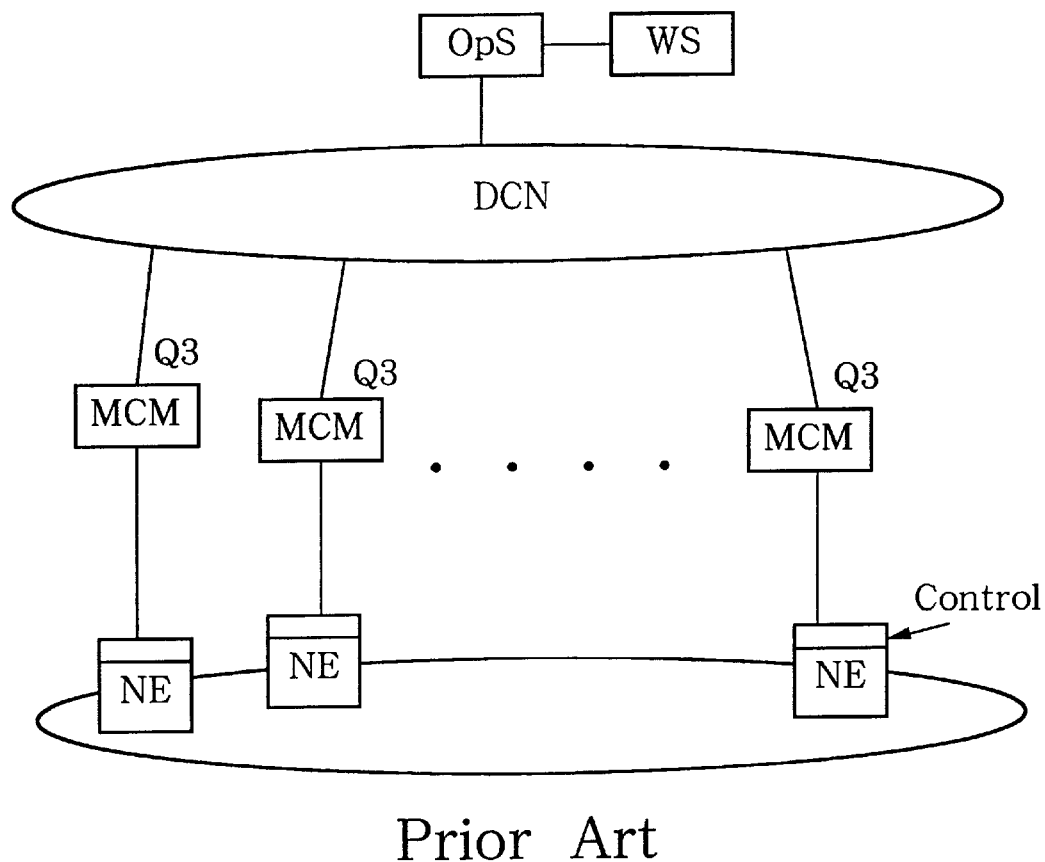
FIG. 1 is a prior art example, showing management network architecture based on the TMN model for a single ring network.
Figure 2:
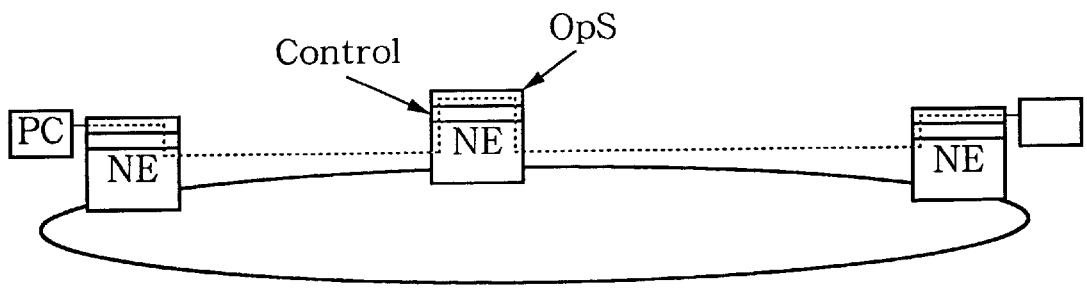
FIG. 2 is a prior art example, showing distributed management network architecture for a single ring network.

As illustrated in FIG. 1, according to the path management method disclosed in the prior art, an operating system OpS held the spare capacities of all the nodes in the form of a database, and after having retrieved optimum routes, sent connection requests to network elements NE (i.e., nodes) via message converter modules MCM (or mediation devices MD).

On the other hand, the embodiment shown in FIG. 3 does not use an operating system located in a separate device from nodes A to C. Instead, it performs path management using main signal processor 22, path management section 20 and controller 21, all of which are provided in each node A to C. Controller 21 exchanges control signals with other nodes. Main signal processor 22 manages various functions of the main signal system, such as multiplexed frame signal termination, multiplexing and demultiplexing, path routing and release, low-speed frame signal termination, and inter-office and intra-office transmissions. In path management section 20, path data collector 10 shown in FIG. 4 obtains the capacities of the links at the local node (i.e., the capacities of the paths that could be connected) and the connection status of any paths. Path router 11 gives instructions and the like regarding routing and release of paths to main signal processor 22 when a path connection or release request occurs. In addition, service class identification 12 identifies the service class to which the information signal to be transmitted belongs, and on the basis of this identification instructs main signal processor 22 to transfer the information signal to the relevant path. Controller 21 is used as a means for communicating with path management section 20 of other nodes. At each node, control information is extracted from the received signal by main signal processor 22 and is handed over to controller 21. Controller 21 extracts information relating to paths from the control information and transfers it to path management section 20. In the case of transmitting, information is transferred in the opposite direction. The actual communication is carried out by packet transfer. It does not matter whether these packets use a data communication channel (DCC) or the like in the overhead provided in the multiplexed frame signal, or whether they use a channel in another signal frame based on wavelength division multiplexing.

Figure 10:
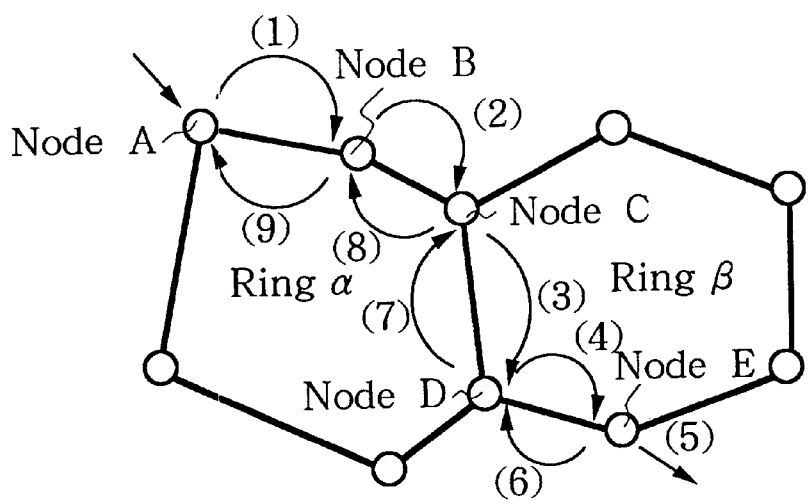
FIG. 10 shows an example of a routing algorithm.

FIG. 10 shows an example of a routing algorithm. This routing algorithm utilizes the first type of path setup method described above. Namely, when there is a path setup request, without using a centralized operating system, the node at which the path setup request has occurred successively sets up a route to the destination node while confirming spare capacity by accessing each node individually. Exchanges between nodes involve sending and receiving control information between respective path management sections 20 shown in FIG. 3. In FIG. 10, it is supposed that node A has requested path setup to node E. Because target node E belongs to ring β rather than to node A's ring α, node A selects the route via bridge node C, since this is the shortest route to ring P. Accordingly, as the first stage of the setup process, node A confirms whether a path (1) can be set up to node B. After spare capacity has been confirmed and the route has been provisionally registered, node A performs a similar confirmation at node B with respect to node C via path (2). After the route has been provisionally registered, bridge node C selects the route via bridge node D, this being the shortest route to node E, and performs a similar confirmation with respect to bridge node D (path (3)). After the route has been provisionally registered, bridge node D performs a similar confirmation with respect to node E, which is the target node (path (4)). Node E confirms that it itself is the target node and that spare capacity from the requesting node to the target node can be guaranteed, and after setting up the connection (path (5)), forwards an instruction to set up up/down channels, in the reverse order to the confirmation order described above (path (6)). After receiving the setup instruction from node E, bridge node D forwards the setup instruction to bridge node C (path (7)). Setup is completed in similar manner at node A, thereby completing the routing process (path (8) and path (9)).

Figure 11:
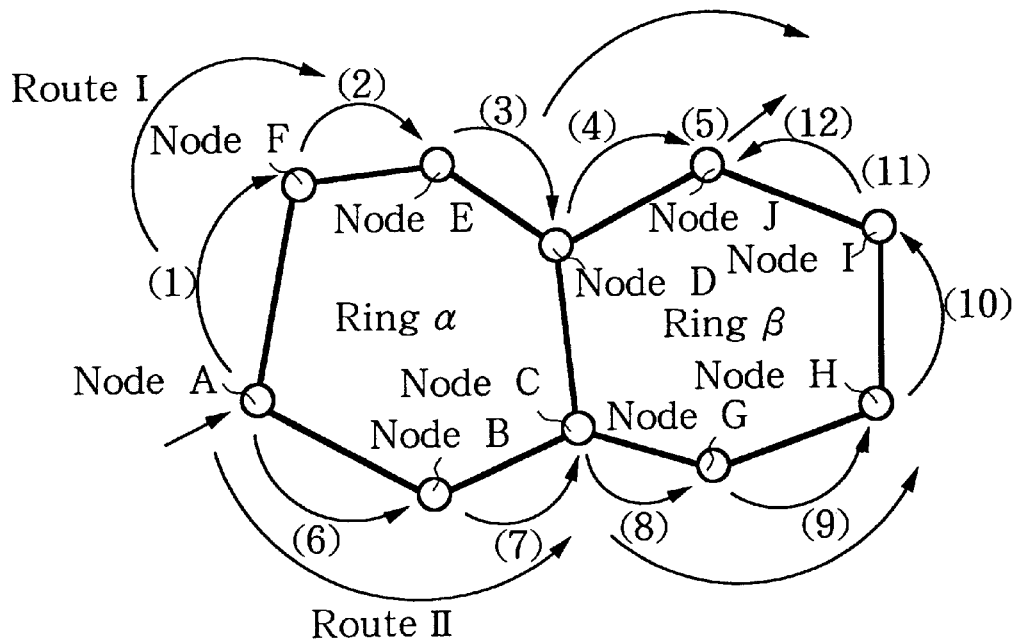
FIG. 11 shows an example of routing a class A path.

FIG. 11 shows an example of routing a class A path. Node A, at which setup of a class A path has been requested, requests the setup of two completely diverse routes, namely clockwise route I and counter-clockwise route II. Node A uses the clockwise route to transmit to node F the information that node J is the target node (path (1)). After spare capacity has been confirmed and the route has been provisionally registered, node F transmits the information from node A to node E (path (2)). Node E performs similar processing (path (3)). Bridge node D determines that for the clockwise route it itself is the bridge node to ring β and accordingly selects the clockwise route in ring β and transmits the information to node J (path (4)). Node J confirms that it itself is the target node and that spare capacity from the requesting node to the target node can be guaranteed, and after setting up the connection (path (5)), forwards a setup instruction in the reverse order to the confirmation order described above. Node A also uses a counter-clockwise route to transmit to node B the information that node J is the target node (path (6)). After spare capacity has been confirmed and the route has been provisionally registered, node B transmits the information from node A to bridge node C (path (7)). Bridge node C determines that for the counter-clockwise route it itself is the bridge node to ring P and accordingly selects the counter-clockwise route in ring β and transmits the information to node G (path (8)). After spare capacity has been confirmed and the route has been provisionally registered, node G transmits the information from node A to node H (path (9)). Similar processing is performed by nodes H and I as well (path (10) and path (11)). Node J confirms that it itself is the target node and that spare capacity from the requesting node to the target node can be guaranteed, and after setting up the connection (path (12)), forwards a setup instruction in the reverse order to the confirmation order described above. The setup of a path including two diverse routes is completed by this sequence of processing steps.

Figure 12:
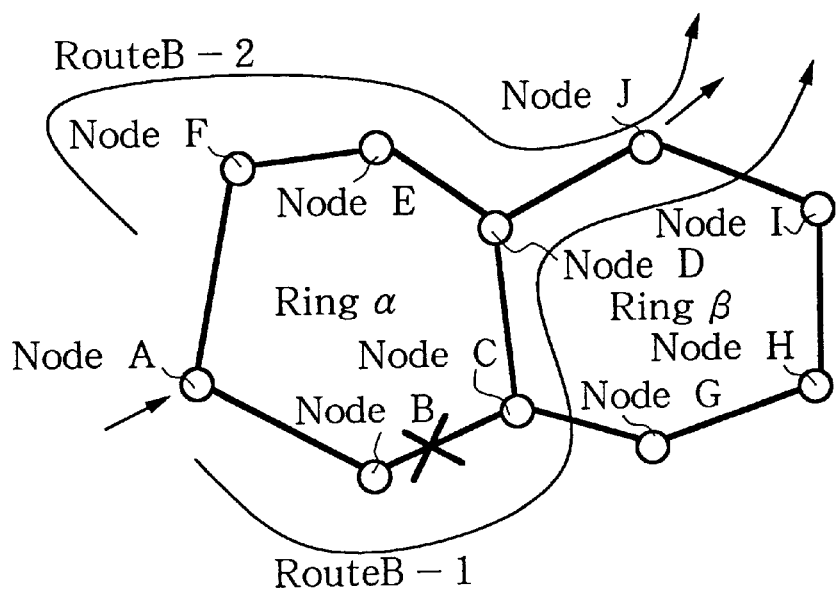
FIG. 12 shows an example of routing a class B path.

FIG. 12 shows an example of routing a class B path. Because a class A path includes two routes giving complete routing diversity, in the event of a failure the path can be restored by selecting the healthy, fully complete route at the receiving node. Because a class C path is restored by an equipment repair, nothing happens automatically when a failure occurs. On the other hand, in the case of a class B path, in the event of a failure the path has to be restored by searching for a new and alternative route. In the present invention, the restoration of a class B path is performed using the routing algorithm shown in FIG. 10. FIG. 12 shows the situation where a failure has occurred between node B and bridge node C. Node A detects that a failure has occurred in ring α and that route B-1 from itself to node J has been broken. Node A therefore changes route B-1 (ring α counter-clockwise followed by ring β clockwise) to route B-2 (ring a clockwise followed by ring β clockwise). The new route is set up by node A accessing nodes F and E and bridge node D in the manner explained in FIG. 10 or FIG. 1. Note that for class B path setup, spare capacity confirmation is necessary at every communication with the other nodes.

In the foregoing embodiment, the packet transfer protocol can be a connection-oriented one such as X.25, or a connectionless one such as the IP protocol, and communication between nodes is performed on a one-to-one basis. Furthermore, in the foregoing embodiment the network configuration data has to be given in advance in a manual.

Next, the second method for distributed setup of paths will be explained.

Figure 13:
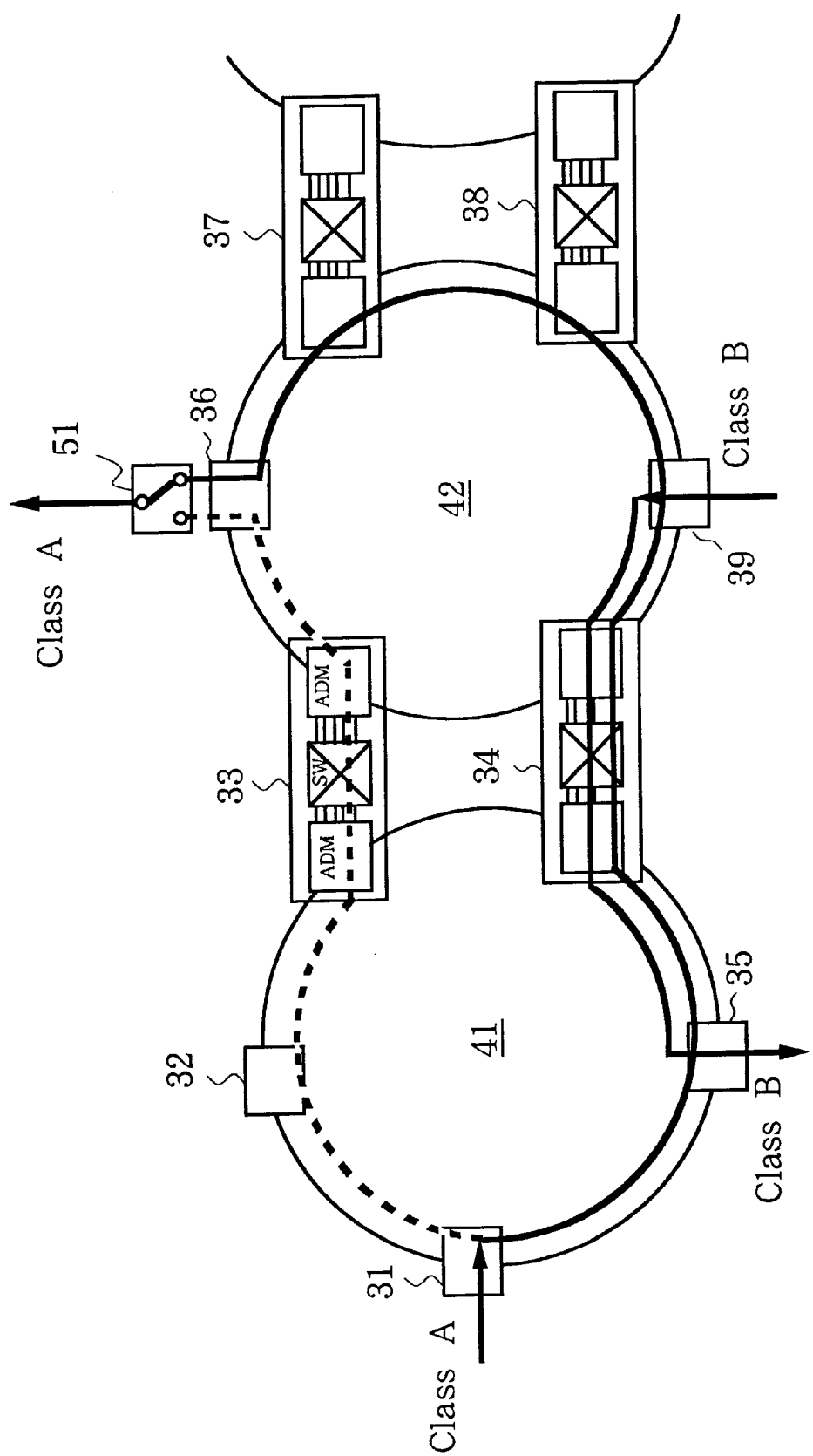
FIG. 13 shows a second embodiment of the present invention.

FIG. 13 shows a second embodiment of the present invention. This second embodiment comprises ring network 41 in which a plurality of nodes 31 to 35 are connected in a ring by transmission lines, and ring network 42 in which nodes 36 to 39 and nodes 33 and 34 are similarly connected in a ring by transmission lines. These two ring networks 41 and 42 are connected to one another by making nodes 33 and 34, which belong to both networks, into bridge nodes. Ring network 42 is also connected to another ring network by making nodes 37 and 38 into bridge nodes. Each of nodes 31–39 is capable of setting up a path to other nodes by using a control channel to send control signals to other nodes. A path is the unit of information transfer.

This embodiment employs high-speed TDM for data transmission and uses a token ring protocol in order to perform path setup by means of distributed operation. This token ring protocol is constructed on the DCC in the section overhead or on a channel in another signal frame based on wavelength division multiplexing. The reason for using a token ring protocol is that the connections in trunk networks are relatively long-lasting and are not changed too frequently, so that connection delay due to token access is not a problem in practice.

Paths are classified into three different grades according to reliability and quality, namely class A, class B and class C. For a class A path, the highest grade of path, two paths are set up in mutually opposite directions around each ring network through which the class A path passes. FIG. 13 shows a class A path between nodes 31 and 36. One of the two paths including the class A path (the clockwise one) is connected to bridge node 33 via node 32, dropped by the add-drop multiplexer (ADM) in this node 33, traverses switch SW, and is connected to ring network 42 by being added from the add-drop multiplexer ADM on the ring network 42 side of switch SW. The path is then connected to receiving node 36. The second of the two paths including the class A path (the counter-clockwise path) is connected to bridge node 34 via node 35, and is then connected to ring network 42 in the manner described above with reference to node 33. The path is then connected to destination node 36 via nodes 39, 38 and 37. In the case of a class A path of this sort, which comprises two separate and diverse paths, the one with the better quality is hitlessly selected by means of hitless switching unit 51 at the destination node. A hitless switching unit 51 is provided at each of nodes 31 to 39, but for present purposes only the hitless switching unit provided at node 36 is shown.

For class B and class C paths, a path is set up in one direction around each ring network through which the class B or class C path passes. FIG. 13 shows a class B path between nodes 39 and 35.

In a multiple-ring topology of this sort, the number of working paths that can be accommodated in each ring, assuming full mesh connectivity for the paths, is expressed by the following equation:

$$A = \frac{N^2 - 1}{8} + \frac{1}{2}(n-j)(j-1)(N-1)^2 + \frac{1}{2}(N-1)^2 \max[n-j, j-1] \quad (1)$$

where N is the number of nodes in a ring, n is the number of rings, and j is the ring number counted from the left. In Equation 1, the first term is the number of intra-ring paths, the second term is the number of paths passing through the j-th ring, and the third term is the number of paths from the j-th ring to another ring. It will of course be seen that the number of paths accommodated in a ring is largest for rings positioned in the middle of the topology.

Figure 14:
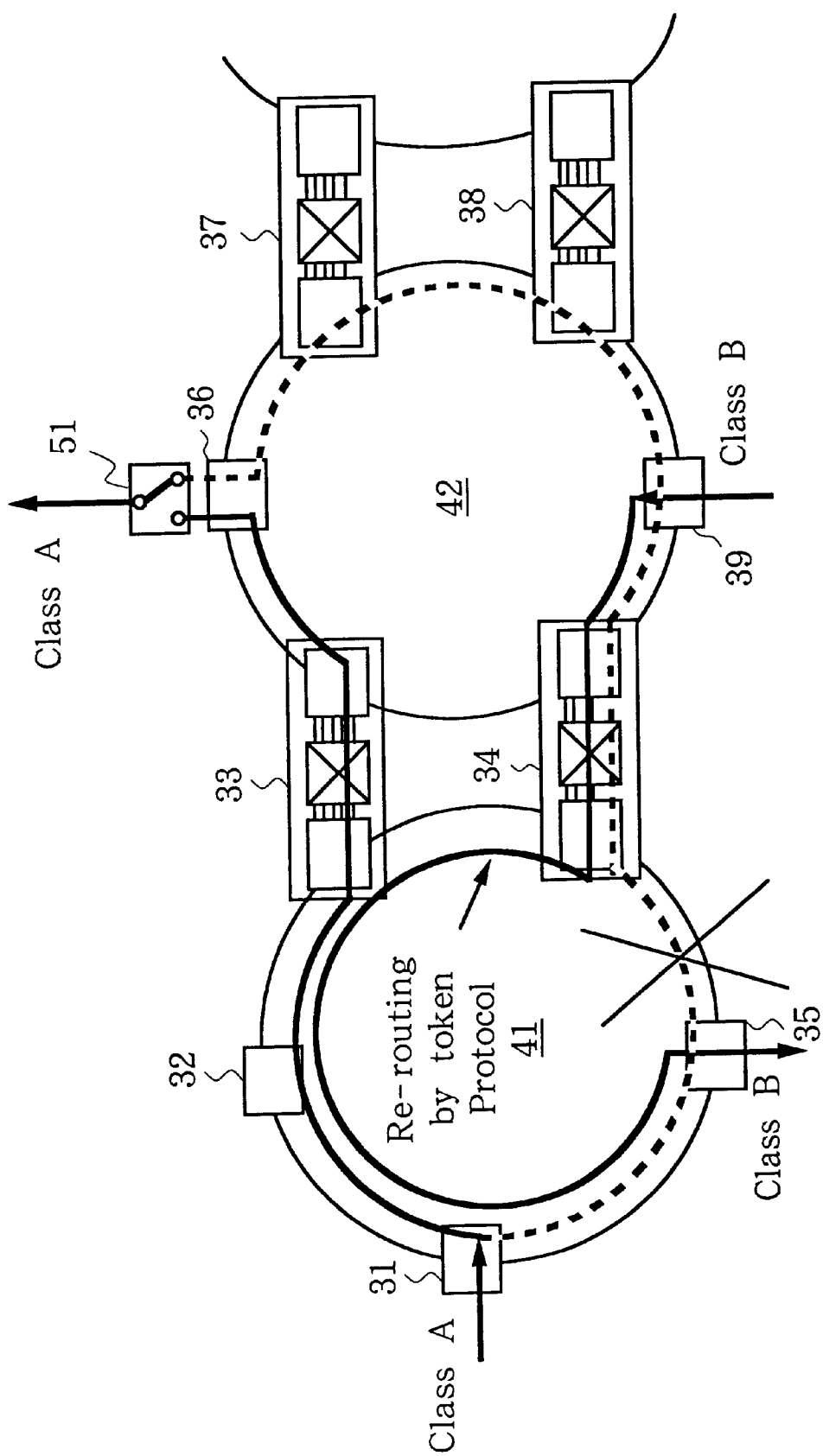
FIG. 14 serves to explain path restoration methods when a link failure has occurred.

FIG. 14 serves to explain path restoration methods when a link failure occurs. For the class A path, restoration is achieved by selecting the non-failed route at hitless switching unit 51 at the receiving node. For the class B path, restoration is achieved by re-routing within ring network 41 only.

FIG. 15 shows the frame format for a token ring constructed on the DCC. In this frame, FC stands for frame control which includes delimiter and token, D-ID is the destination node ID, S-ID is the source node ID, and C is a packet type identification field indicating whether the packet is a routing packet, a response packet. The frame also includes a data field and a frame check sequence FCS. The data field contains a number of different areas. The grade area indicates the class of the path (this is equivalent to the service class identifier in the first embodiment). The c/cc area shows the direction of packet flow (clockwise or counter-clockwise). The capacity of the path for which there is a connection request is written in the path capacity area. The intermediate node area holds the flags set by each intermediate node between the source and destination nodes. The bridge (drop) ID area contains an identifier of either the bridge node or the destination node. Finally, there is an area showing whether or not a path spans a ring.

The present invention is not restricted to the token protocol shown in FIG. 15 and can likewise be implemented by the IBM Token-Ring protocol or by the Loop 1 Protocol of Mitsubishi Electric. Moreover, if the control scheme uses a token protocol, it can be implemented using either a multi-token scheme or an early token release scheme. Although it will be assumed that each ring is a bi-directional 2-fiber ring, this invention can be embodied in similar manner using 4-fiber rings. The token circulates in one direction only, but packets can-be transmitted in both directions.

Figure 16:
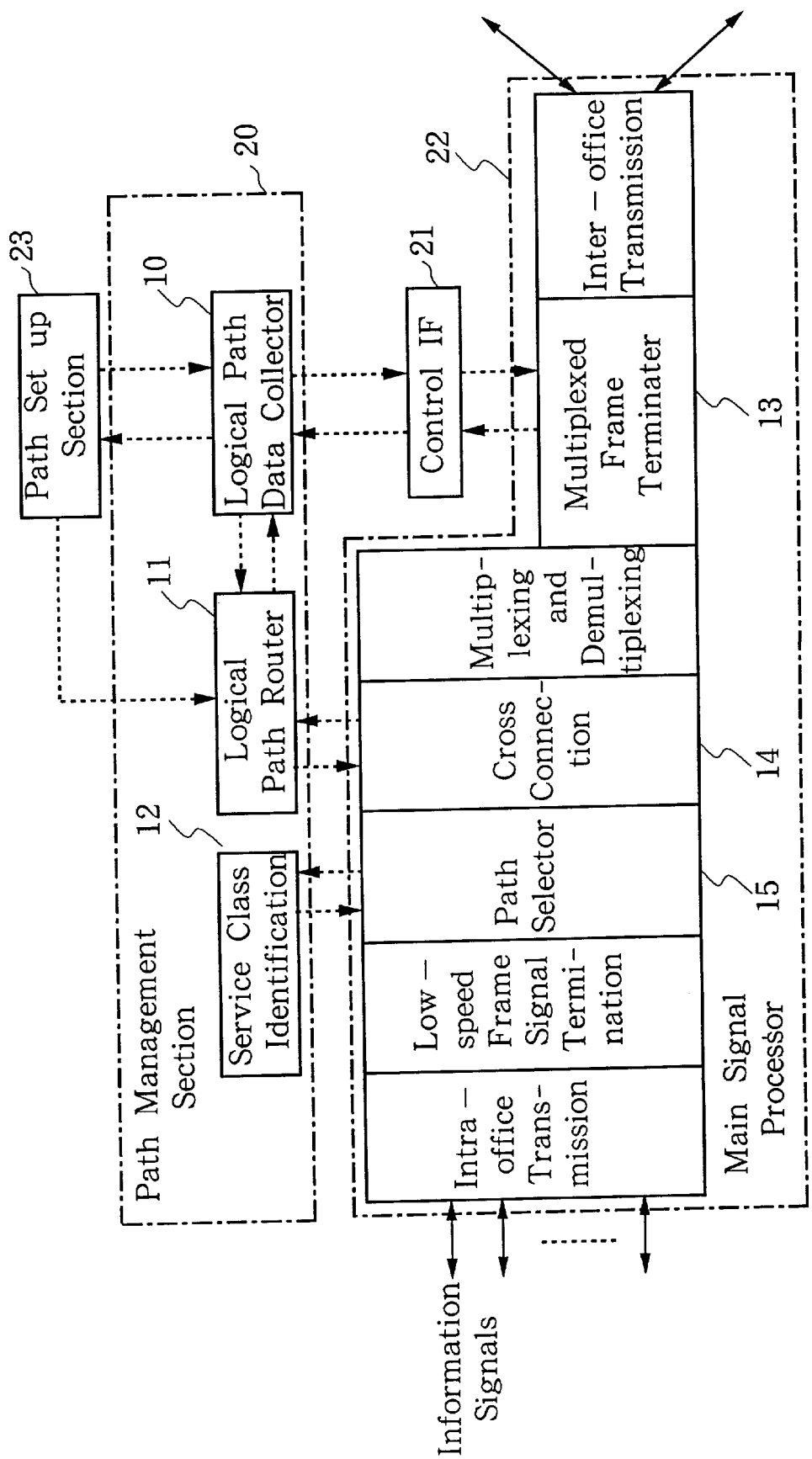
FIG. 16 is a block diagram of a node.

FIG. 16 shows another example of the configuration of a node. In this example, path setup section 23 for setting up a path prior to transmission of control signals is added to the node configuration shown in FIG. 4.

Figure 17:
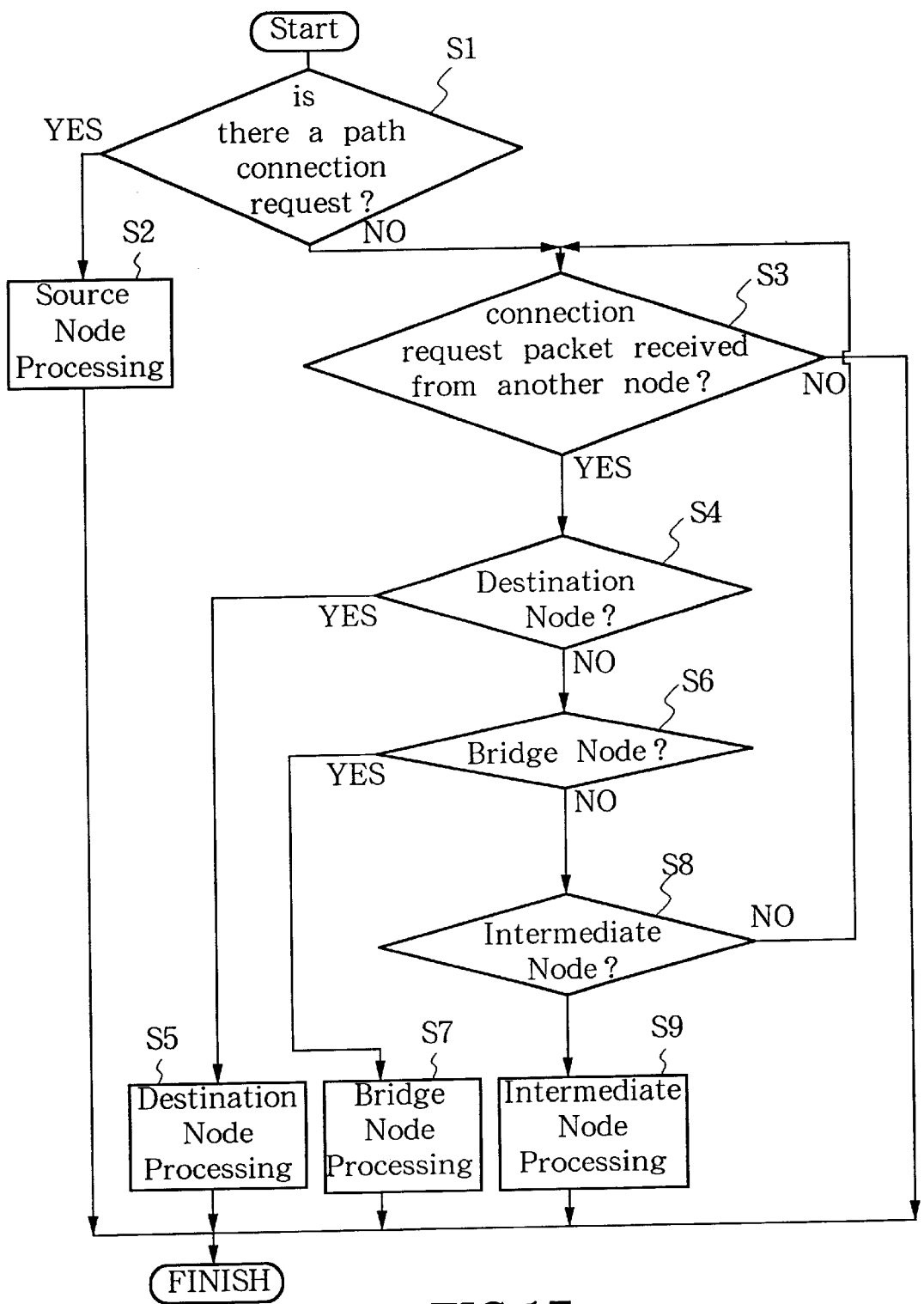
FIG. 17 shows the overall control flow for path setup, involving each type of node.
Figure 18:
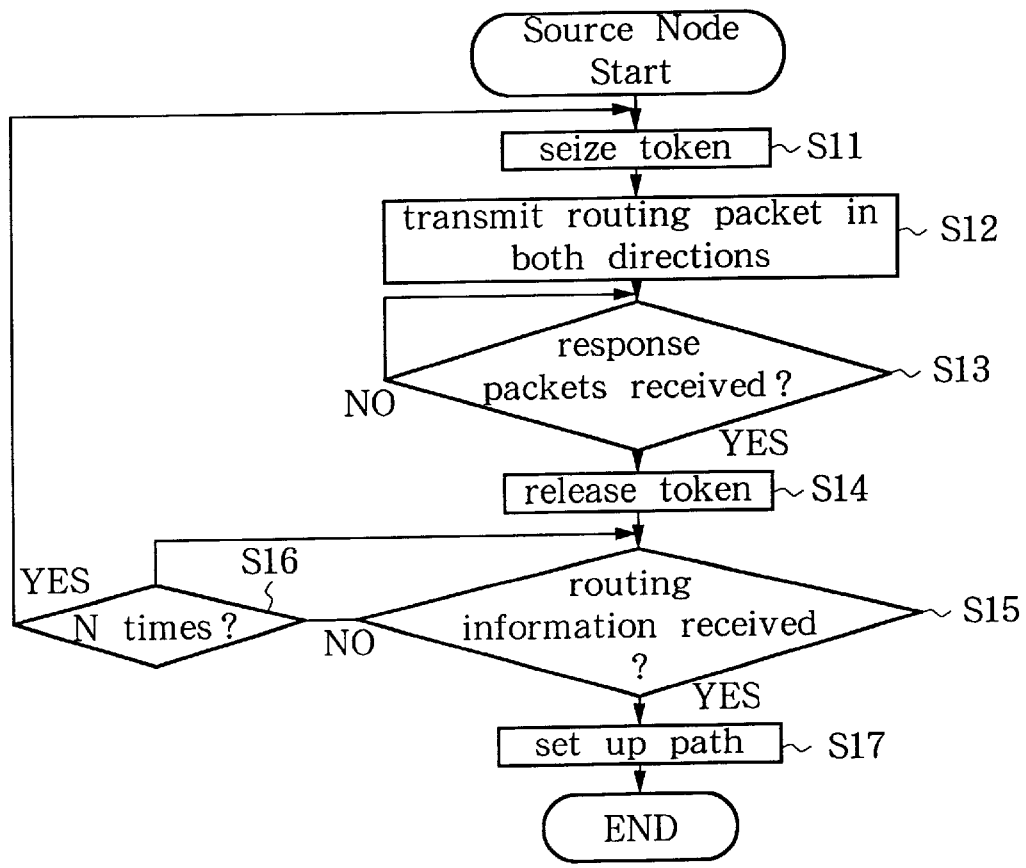
FIG. 18 shows the control flow at a source node.
Figure 19:
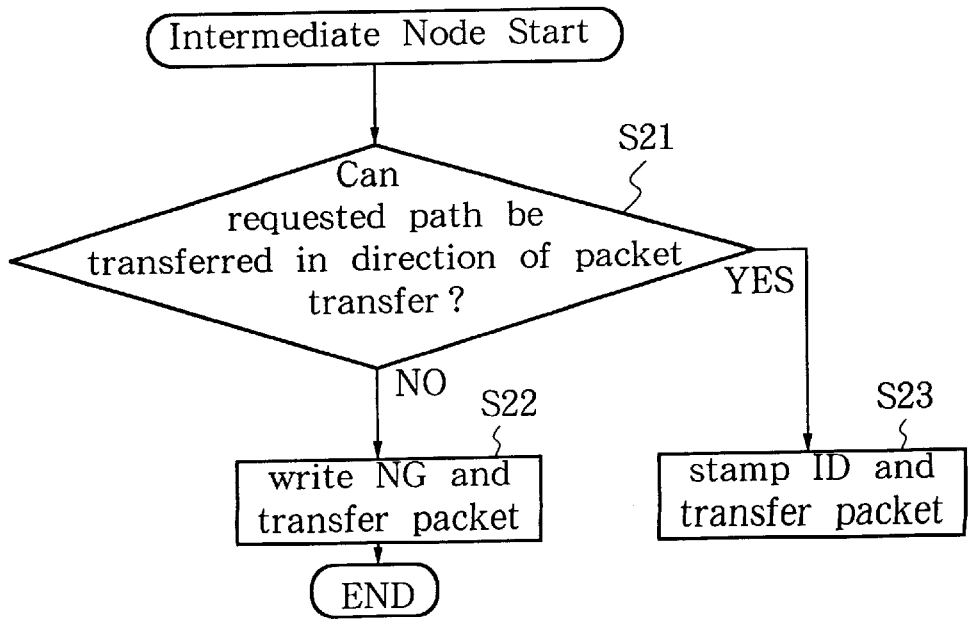
FIG. 19 shows the control flow at an intermediate node.
Figure 20:
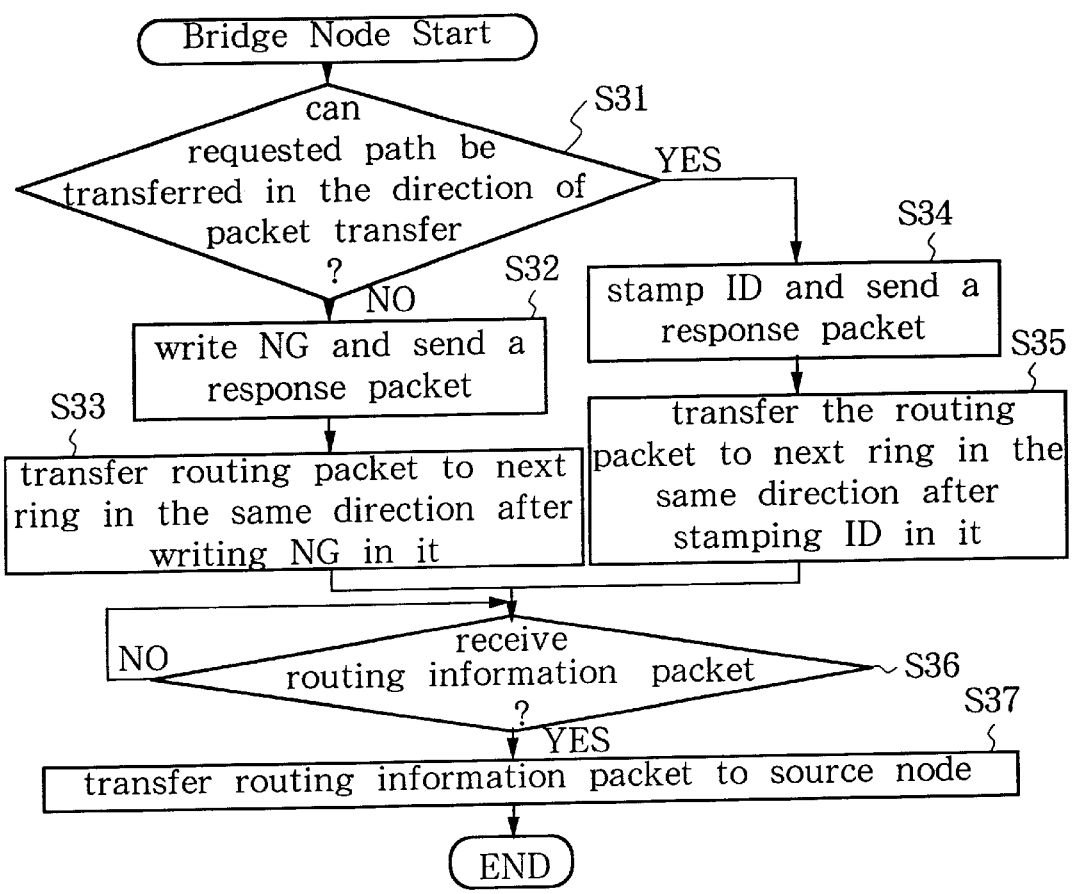
FIG. 20 shows the control flow at a bridge node.
Figure 21:
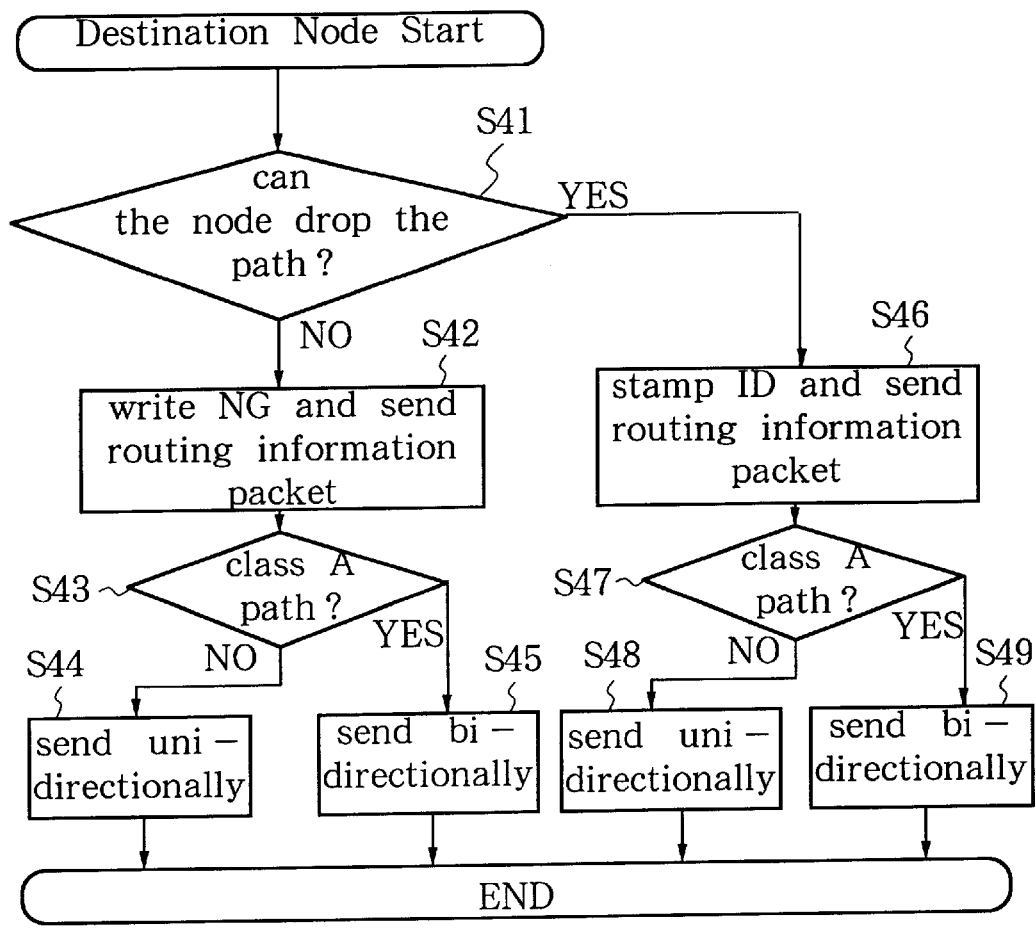
FIG. 21 shows the control flow at a destination node.

FIG. 17 to FIG. 21 show the control flow of path setup at each type of node. FIG. 17 shows the overall control flow, FIG. 18 shows the operation of a source node, FIG. 19 shows that of an intermediate node, FIG. 20 that of a bridge node, and FIG. 21 that of a destination node.

Each node performs the control shown in FIG. 18 as a source node (S2) when there is a path connection request (S1). Likewise, each node performs the control shown in FIG. 19 as an intermediate node (S9) when it has received a "connection request packet" from another node (S3) and it is necessary to operate as an intermediate node (S8). Again, each node performs the control shown in FIG. 20 as a bridge node (S7) when it has received a "connection request packet" from another node (S3) and it is necessary to operate as a bridge node (S6). Finally, each node performs the control shown in FIG. 21 as a destination node (S5) when it receives a "connection request packet" from another node (S3) and the node in question has been designated the destination node (S4).

Although FIG. 17 to FIG. 21 show the control performed at a single node, when a path is being set up, a plurality of related nodes operate respectively as a source node, intermediate nodes, bridge nodes and a destination node. These operations will now be explained, using as an example the case of setting up a path between two ring networks including ring #a and ring #b.

When a node at which there is a path setup request (the source node) seizes a token (S11) which is circulating in one direction only in ring #a, it writes the path grade, capacity and so forth in a connection request packet and transmits this packet in both directions, i.e. clockwise and counter-clockwise, as a routing packet, to perform a double route search (S12). Each intermediate node stamps its own identifier (ID) in the repeater node area of a received routing packet if there is sufficient spare bandwidth to transfer the relevant path in the direction the received packet is traveling (S21, 23), and then repeats that packet. If the path cannot be transferred to the next node, the intermediate node writes "no good" (NG) (S22). When a bridge node receives the routing packet, it stamps ID or NG in the relevant area of the packet in accordance with whether or not it can connect the path to the next ring #b, duplicates the packet and stores the duplicate in buffer memory, rewrites the C field of the original packet, and sends this packet into ring #a as a "response packet" (S31, S32, S34). A response packet which has returned to the source node after travelling around ring #a is terminated (S13) and the token is released (S14). A token can be released after a packet is terminated, or after the token is terminated. Alternatively, it can be released after several packets have been transmitted, or a multi-token control scheme can be adopted. Here, for simplicity, a single token and packet termination scheme will be explained.

Because a packet is transferred both clockwise and counter-clockwise, two nodes in ring #a constitute bridge nodes. Each of these two bridge nodes seizes a token in ring #b and transmits the stored "routing packet" towards the destination node in the same direction as the received packet flow (S33, S35). A bridge node achieves class A path route diversity by transmitting a packet received in the clockwise direction from ring #a in the clockwise direction in ring #b, and by transmitting a packet received in the counter-clockwise direction from ring #a in the counter-clockwise direction in ring #b. The same preservation of direction applies to routing within ring #b as well.

After the destination node in ring #b has confirmed that the path can be connected (S41), it transmits a "routing completion" notification packet (S46). If the path cannot be corrected, it transmits a "routing information packet" by writing NG. If the path of interest requires class A, two "routing information packets" are transmitted via the two routes (S45, S49). If the path requires class B or C, a single "routing information packet" is sent via the shorter route (S44, S48). In other words, for class B and class C paths, the routing completion notification packet is transferred via one route only from the destination node to the source node. Note that at the same time as each bridge node transfers a "routing information packet" to the next ring, it uses the opposite route to transmit the response packet in ring #b upon receipt of the "routing information packet" (S36, S37).

For a class B path, each intermediate node on the opposite side of the ring from the working route watches the content of this "response packet", and if it can guarantee a protection path within the ring, writes its ID in the "response packet" (S21, S23). If it cannot guarantee a protection path, it writes NG (S22). The NG flag is subsequently transferred to the source node from the bridge node or destination node which terminates the "response packet".

When the "response packet" is received, the source node releases the token (S14) and sets up the requested path after the routing information has been received (S15). If the routing information cannot be received N times (S15, S16), routing is respected.

The average delay from the occurrence of a path connection request to connection establishment depends on the frequency of the connection requests. If the occurrence of connection requests is assumed to be a random process, average delay can be expressed by the following equation:

$$T = \left(\frac{1}{2(\rho-1)}\left(\rho+1-\frac{\rho}{N}\right)+\frac{3}{2}\right) * \qquad (2)$$
$$N * \left(\tau_f * \frac{L_h + (N+2)\log(n*N+1)}{d} + tL + \tau_p\right)$$

where N is the number of nodes in a ring, $\tau_f$ is the transfer time for one SDH frame, d is the number of DCC channel bits per frame, n is the number of rings, t is the propagation delay, L is the link distance, $\tau_p$ is the packet processing time per node, $L_h$ is the packet overhead, and p is connection request frequency.

Figure 22:
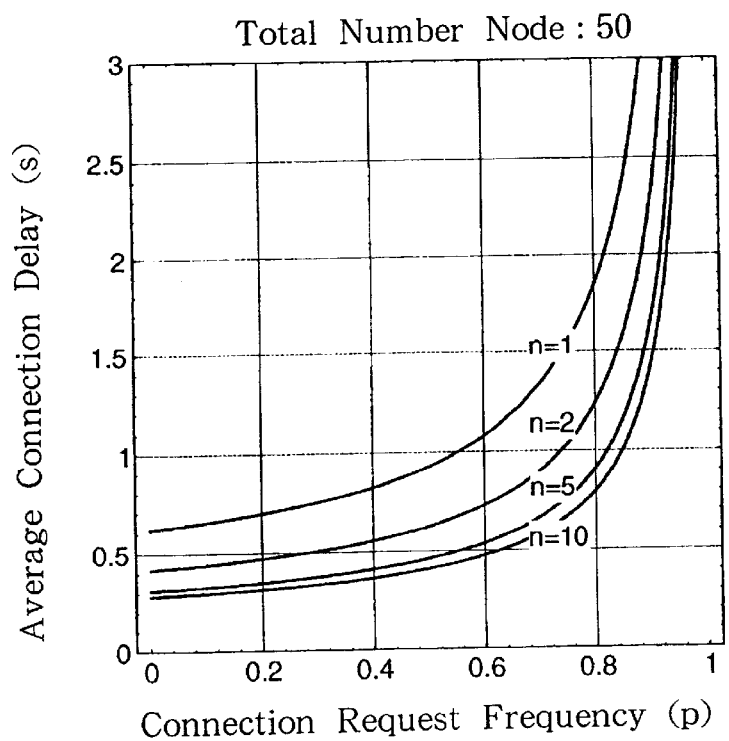
FIG. 22 shows the relation between path connection request frequency and mean connection delay.

FIG. 22 shows the relation between path connection request frequency and average connection delay obtained by means of Equation 2. The horizontal axis plots connection request frequency ρ, which shows how many connection requests occur during a round trip of the token in a ring. It is assumed that the total number of nodes is 50, $\tau_f$=125 μs, d=12 bytes, t=5 ns/m, L=100 km for each link, $\tau_p$=1 ms, and $L_h$=8 bytes. Average connection delay decreases with increasing number of rings (i.e., with decreasing number of nodes in a ring). This is because the probability of a given node getting the token increases due to the total number of tokens increasing. It will be seen that if the total number of nodes is about 50, the average connection delay is of the order of seconds.

An explanation will now be given of self-healing.

A class A path is a high-reliability path which never loses even a single bit of information. This is achieved by duplicating the path at the source node and accommodating it in two different routes, and by hitless switching at the destination node.

Figure 23:
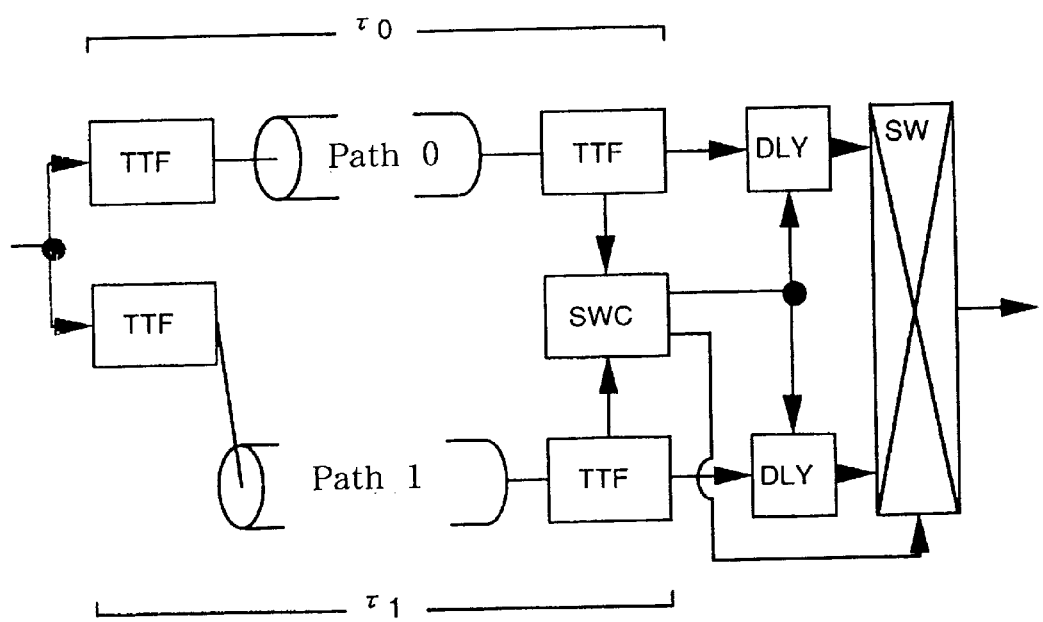
FIG. 23 shows an example of a configuration for hitless switching.

FIG. 23 shows an example of a configuration for hitless switching. The class A path passes from two TTFs (Transport Terminating Function) at the source node side through separate paths (path 0 and path 1), and is terminated by two TTFs at the destination node side. The delay in path 0 is $\tau_0$ and the delay in path 1 is $\tau_1$. The outputs of the two transport terminating functions at the destination node side are connected to hitless switch SW via delays DLY which can be based on memory, and the amount of delay introduced by delays DLY, and the operation of hitless switch SW, are controlled by switching control SWC. Switching control SWC compares the two paths frame-by-frame and activates the switch when it detects an error in the B3 byte of a VC frame. When an error is detected, the switch selects the better quality path. The effect of this scheme is not only hitless switching in the event of an unforeseen failure, but also an improvement in transmission performance under normal conditions, with the output BER becoming lower than the BER of the transmitted path. The output BER $\epsilon^{out}$ of the switch can be expressed by the following equation:

$$Q(\epsilon^{out})=Q(\epsilon^0)*Q(\epsilon^1) \quad (3)$$

where $\epsilon^1$ is the BER in the working path and $\epsilon^2$ is the BER in the protection path. $Q(\epsilon)$ is the probability of an error being detected in one frame on the basis of B3 (BIP-8), and can be expressed as follows:

$$Q(\epsilon)=1-|1-P(\epsilon)|^8 \quad (4)$$

where $P(\epsilon)$ is the probability of detecting a parity error in one rail of BIP-8, and can be expressed as follows:

$$P(\epsilon)=1-^{1+(1-2\epsilon)^{N_R}} \quad (5)$$

Figure 24:
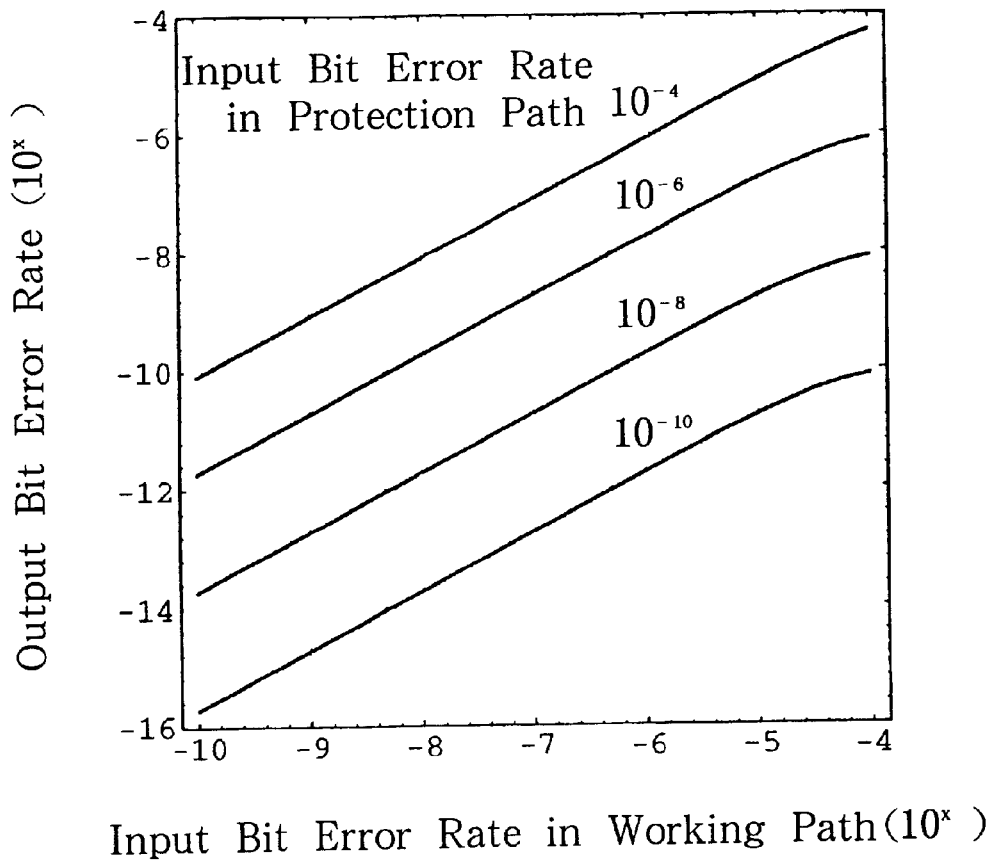
FIG. 24 shows the bit error rate improvement obtained by hitless switching.

FIG. 24 shows the error improvement effect obtained when the path is assumed to be a VC-4 (156 Mbit/s). If input BER is $10^{-10}$ on both the working and protection paths, output BER at the hitless switching circuit can be improved to as low as $10^{-16}$.

Next, an explanation will be given of self-healing for class B paths. Class B paths are ranked as medium reliability paths which, although they do not require hitless switching, do require switching to a protection route in the event of a failure in the network. Whereas path restoration for a class A path involves dedicated switching, a class B path employs shared switching. In conventional shared switching schemes, completely different methods and equipment have been used for path setup and path restoration. As opposed to this, in the present invention the same algorithm that is employed in path setup is used for path restoration as well, and some equipment is shared. Below, an explanation will be given of the differences between path restoration and path setting.

When a failure occurs (e.g., a link failure), the nodes at either end of the failed link detect Loss of Signal (LOS) and generate a section alarm. Whereas in the normal state the token was transferred around the ring in one direction only, when the failure occurs the two adjacent nodes loop back the token on the section overhead of opposite direction (the function can be realized in the firmware or software platform), causing it to be transferred around the ring in opposite directions. By doing this, all the nodes can get the token despite the link failure. An important point is that it is only the token contained in the protocol (the FC bytes) which is looped back, whereas the main signal is restored in the path layer. In the failure state, all the class B paths that had been carried by the failed link request path connection, and unlike the occurrence of connection requests at path setup, this is not a random process. A node which has seized the circulating token reconnects a single failed path relating to that node using the same algorithm as in the case of path setup, and releases the token. The node which next seizes the token does the same. In this way, the paths are successively reconnected one by one.

Figure 25:
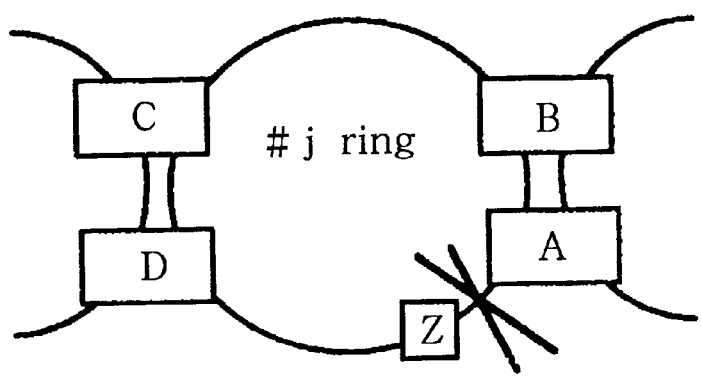
FIG. 25 shows the situation where a failure has occurred in the j-th ring network containing nodes A, B, C, D and Z.
Figure 26:
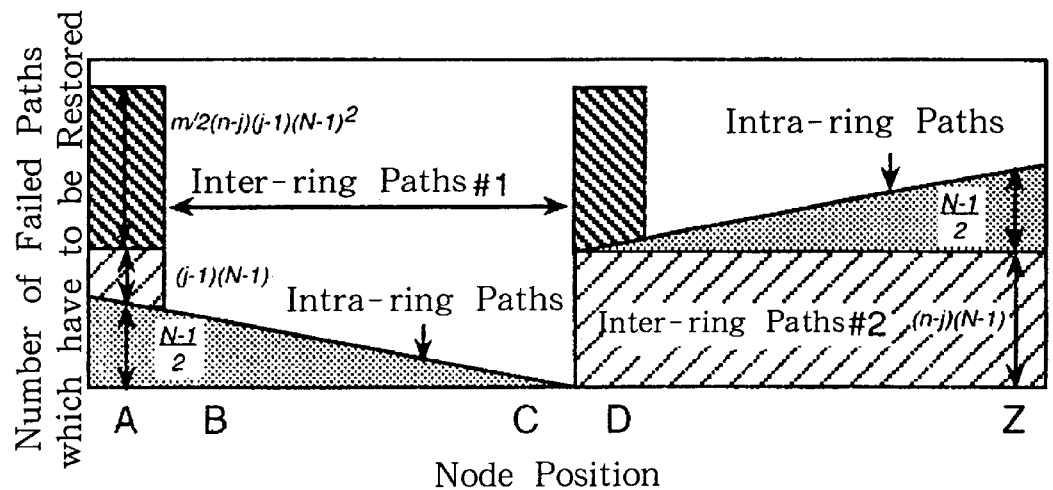
FIG. 26 shows the relation between node position and the number of paths which have to be restored, on the assumption that all failed paths are class B.
Figure 27:
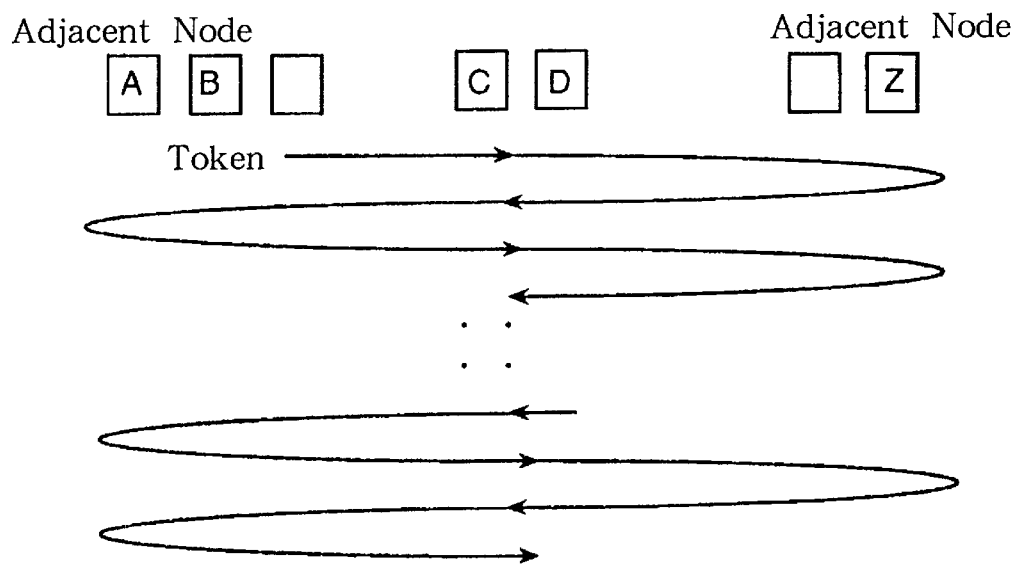
FIG. 27 shows schematically how a token is transferred between all of the nodes by loop-back.

FIG. 25 to FIG. 27 serve to explain the self-healing characteristics of class B paths. FIG. 25 shows the situation where a failure has occurred in the j-th ring network containing nodes A, B, C, D, and Z. FIG. 26 shows the relation between node position and the number of paths which have to be restored, on the assumption that all the failed paths are class B. FIG. 27 shows schematically how a token is transferred between all the nodes by loop-back.

It will be assumed that a worst-case failure has occurred in the ring, namely, in the link between bridge node A and its adjacent node Z. Paths affected by this failure include inter-ring paths #1 which pass through this j-th ring network (equivalent to the second term of Equation 1); inter-ring paths #2 which connect this j-th ring network to another ring network (equivalent to the third term in Equation 1); and intra-ring paths (defined by the first term in Equation 1). The restoration of inter-ring paths #1 has to be shared by nodes A and D which are bridge nodes of the j$-1^{th}$ and the j$+1^{th}$ ring networks, respectively. The parameter m in FIG. 26 is the average apportionment coefficient between nodes A and D (note that processing based on token protocol averages the burdens of path reconnection processing), and can be expressed by the following equation:

$$m = -\frac{8-j-3N+3jN-3n+jn+Nn-jnN}{2(j-1)(n-3)(N-1)} \quad (6)$$

Because nodes A and Z are located at the ends of the failed link, the token is looped back at these nodes A and Z. At any given node, the processing time for simply transferring a packet to a neighboring node will be termed $\tau_{r1}$, and the processing time for restoring a path will be termed $\tau_{r2}$. These two parameters can be expressed as follows:

$$\tau_{r1} = \tau_f \frac{L_h + (N+2)\log(nN+1)}{d} + tL + \tau_p \quad (7)$$

$$\tau_{r2} = N\tau_{r1}$$

Restoration performance of class B paths at a given time can be characterised as shown in the following table: namely, as a function of k, the number of times a token loops back.

| Loops-back times | Time | Restored paths |
| --- | --- | --- |
| $1 < k < (N-1)/2$ | $N\tau_{r1} + (N-k+1)\tau_{r2}$ | $(N-k+1)\tau_{r2}$ |
| $k < \max[n-j, j-1](N-1)$ | $N\tau_{r1} + \frac{1}{2}(N+1)\tau_{r2}$ | $\frac{1}{2}(N+1)\tau_{r2}$ |
| $k < (N-1)/2 + (j-1)(N-1)$ | $N\tau_{r1} + (3+(N-1)/2-k)\tau_{r2}$ | $(3+(N-1)/2-k)\tau_{r2}$ |
| $k < (N-1)/2 + (j-1)(N-1) + m/2(n-j)(j-1)(N-1)^2$ | $N\tau_{r1} + 2\tau_{r2}$ | $2\tau_{r2}$ |

The restoration ratio R(T) is defined as the ratio of the number of restored paths at a given time to the total number of failed paths, and can be expressed as follows:

$$R(T) = R_i(T) + \sum_{h=1}^{i-1} R_h(\Delta t_h) \quad (8)$$

-continued where:

$$\sum_{h=1}^{i-1} \Delta t_h < T < \sum_{h=1}^{i} \Delta t_h \qquad (9)$$

$$R_1(t) = \sum_{h=1}^{s(t)} \frac{N-h}{A} + \frac{1}{A} \frac{Ns(t)-1}{Nt_{r1}+(N-s(t)-1)t_{r2}} t \qquad (10)$$

$$R_2(t) = \frac{1}{A} \frac{N+3}{2Nt_{r1}+(N+3)t_{r2}} t$$

$$R_3(t) = \sum_{h=1}^{k(t)} \frac{N+5-2h}{2A} + \frac{1}{A} \frac{N+5-2k(t)}{2Nt_{r1}+(N+5-2k(t))t_{r2}} t$$

$$R_4(t) = \frac{1}{A} \frac{2}{Nt_{r1}+2t_{r2}} t$$

and:

$$s(t) = \left[ N\frac{t_{r1}}{t_{r2}} + \left(N + \frac{1}{2}\right) - \sqrt{\left(\left\{Nt_{r1}+\left(N+\frac{1}{2}\right)t_{r2}\right\}^2 - 2t_{r2}*t\right)} \right] \qquad (11)$$

$$k(t) = \left[ N\frac{t_{r1}}{t_{r2}} + \left(\frac{N}{2}+3\right) - \sqrt{\left(\left\{Nt_{r1}+\left(\frac{N}{2}+3\right)t_{r2}\right\}^2 - 2t_{r2}*t\right)} \right]$$

$$\Delta t_1 = \frac{N-1}{2}\left(Nt_{r1} + \frac{3}{4}(N+1)t_{r2}\right) \qquad (12)$$

$$\Delta t_2 = \left(Nt_{r1} + \frac{N+1}{2}t_{r2}\right)(n-j)(j-1) - \frac{N-1}{2}$$

$$\Delta t_3 = \left(Nt_{r1} + \frac{N+1}{2}t_{r2}\right)\frac{N-1}{2}$$

$$\Delta t_4 = (Nt_{r1}+2t_{r2})\frac{m}{2}(n-j)(j-1)(N-1)^2$$

Figure 28:
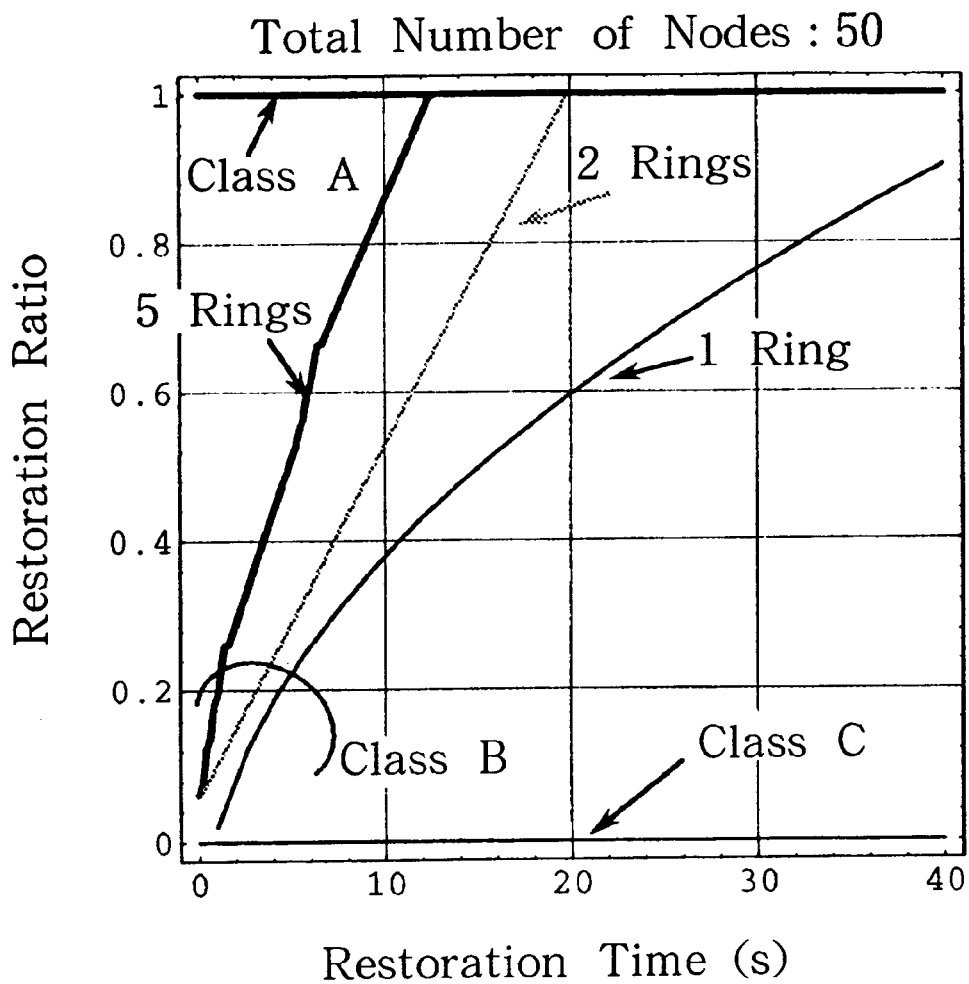
FIG. 28 shows restoration ratios obtained by calculation.

FIG. 28 shows restoration ratios calculated using the above equations. The total number of nodes is assumed to be 50 and calculation results are given for the case of a single ring, two rings, and five rings. The rest of the parameters are the same as in FIG. 22. FIG. 28 also shows the restoration ratios for class A, where hitless switching achieves instantaneous restoration, and for class C, where path restoration has to wait for hardware maintenance. For class B paths, complete restoration takes more than 40 seconds in the case of a single ring, is 20 seconds with two rings, and is around 10 seconds when there are five rings. It is anticipated that restoration time will be longer with the first embodiment than with the second embodiment. The reason for this is that in the first embodiment the number of packets to be processed increases in proportion to the number of nodes.

An important point in the second embodiment is that with a multiple-ring configuration, path setup can be performed without information on network configuration. Moreover, modifying this method would enable information on the network configuration of node deployment.

Explanations will now be given of how methods for obtaining information on network configuration of node deployment and for recognizing node condition can be applied to the operation and management of distributed control type multiple-ring networks.

Japanese Laid-Open Patents No. 8-191318 and No. 7-58765 disclose methods for recognising conditions in a single ring with centralised control. These methods require a master node for gathering information and controlling the network. Japanese Laid-Open Patent No. 8-23200 discloses a condition recognition method which is applicable to distributed control. According to this method, a remote device which can be connected to an arbitrary node learns node conditions by causing a management packet to circulate on the loop, this management packet having a pointer indicating node number and a region in which an address can be set. Given that this system enables control to be carried out from an arbitrary node, it can be implemented in a distributed control system as well.

However, if this system is implemented without modification on a multiple-ring network, the two bridge nodes which connect a given two rings will each independently transfer a management packet to the next ring. Consequently, if the number of rings is N, the number of management packets in the network as a whole will be $2^N$, thereby giving rise to the problem that the "management packets" causes congestion which results in degradation of network performance.

An explanation will now be given of an embodiment which solves such problems and which makes it possible to learn how nodes are arranged and to recognize their condition in distributed control multiple-ring networks in which each pair of ring networks is connected by two bridge nodes.

Figure 29:
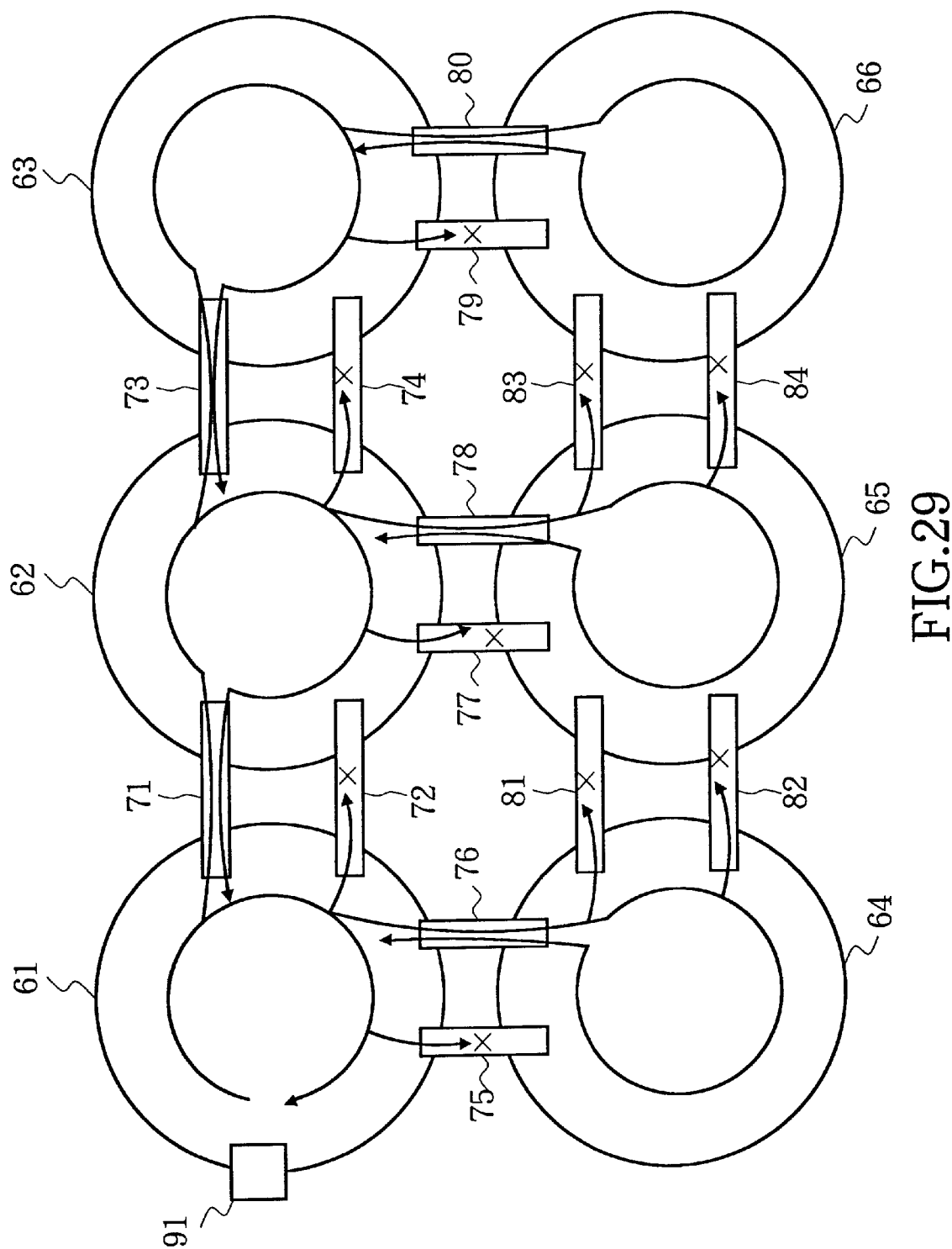
FIG. 29 shows a third embodiment of the present invention.

FIG. 29 shows a third embodiment of the present invention. This embodiment is a multiple-ring transmission facility which has six ring networks 61 to 66, each comprising a plurality of nodes connected in ring form by transmission lines. Ring networks 61 and 62 are connected via bridge nodes 71 and 72, ring networks 62 and 63 are connected via bridge nodes 73 and 74, ring networks 61 and 64 are connected via bridge nodes 75 and 76, ring networks 62 and 65 are connected via bridge nodes 77 and 78, ring networks 63 and 66 are connected via bridge nodes 79 and 80, ring networks 64 and 65 are connected via bridge nodes 81 and 82, and ring networks 65 and 66 are connected via bridge nodes 83 and 84. Ring networks 61 to 66 have nodes other than bridge nodes, but in FIG. 29 these other nodes are omitted with the exception of source node 91 which transmits "node information collecting packets" for collecting information relating to the network configuration of node deployment and condition of nodes. FIG. 29 also shows an example of a transfer route for a node information collecting packet.

In this embodiment, connection between nodes of ring networks 61 to 66 is performed under distributed control, and this control is achieved by efficiently collecting information relating to the network configuration of node deployment and conditions of the nodes in each ring. This information can be collected from any node. In the following explanation, it is assumed that it is source node 91 in ring network 61 which is collecting information. Transmission of a node information collecting packet from source node 91 takes place either when the network is built, or when a new node is added. In other words, the node which constitutes source node 91 can be a node at which actions for setting up the network are performed when the network is built, or it can be a node which is added once the network is operating.

First of all, using a token protocol constructed on the section overhead (SOH) in similar manner to the second embodiment, source node 91 transmits a node information collecting packet in one direction around ring network 61. The signal for collecting node information is carried in the data field section of the node information collecting packet. Only one token is present in a ring network, and only a node that has seized the token can transmit a packet.

A node information collecting packet that has been sent from source node 91 circulates around ring network 61 on the SOH. Each node successively stamps its ID in the packet, or writes NG if the node has failed. A packet which has travelled around the ring and returned to source node 91 is stored in memory and terminated.

The pair of bridges which connect ring networks 61 and 62, i.e., bridge nodes 71 and 72, can store the node information collecting packet in memory so that it can be passed over to the next ring network 62. Of these two bridge nodes 71 and 72, only bridge node 71, which seized the first token, transfers the node information collecting packet to the next ring network 62. Bridge node 72, which has received the node information collecting packet transferred by the other bridge node 71 but which has not seized the token, deletes the packet in its memory.

Bridge node 71, which has transferred the node information collecting packet, stores the node information collecting packet which has circulated around the ring and returned, terminates it, and sends it back to original ring network 61. At this point, it inhibits the other nodes to write any information on the packet, which is possible by changing C field in the packet.

If a node which has already processed a packet receives the same packet again within a prescribed time, it deletes that packet. For simplicity, FIG. 29 shows the deletion of packets by bridge nodes, but this can be carried out at any node.

By repeatedly forwarding and returning "node information collecting packets" between ring networks, one node information collecting packet is returned from each of the ring networks 61 to 66, and information on the network configuration of node deployment and condition of all the nodes can be efficiently collected.

Figure 30:
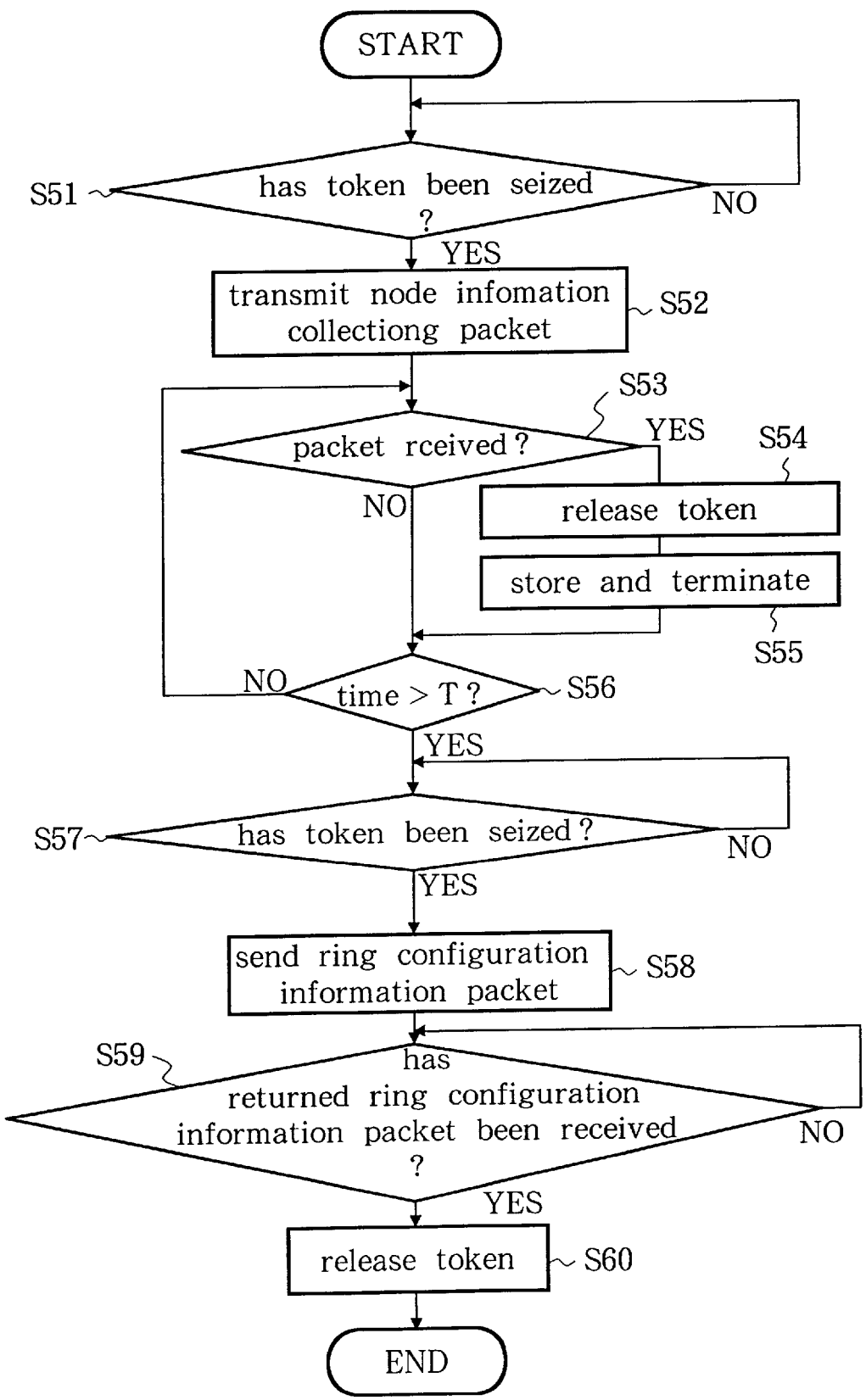
FIG. 30 shows the processing flow for a source node which wants to collect information relating to node arrangements and conditions.
Figure 31:
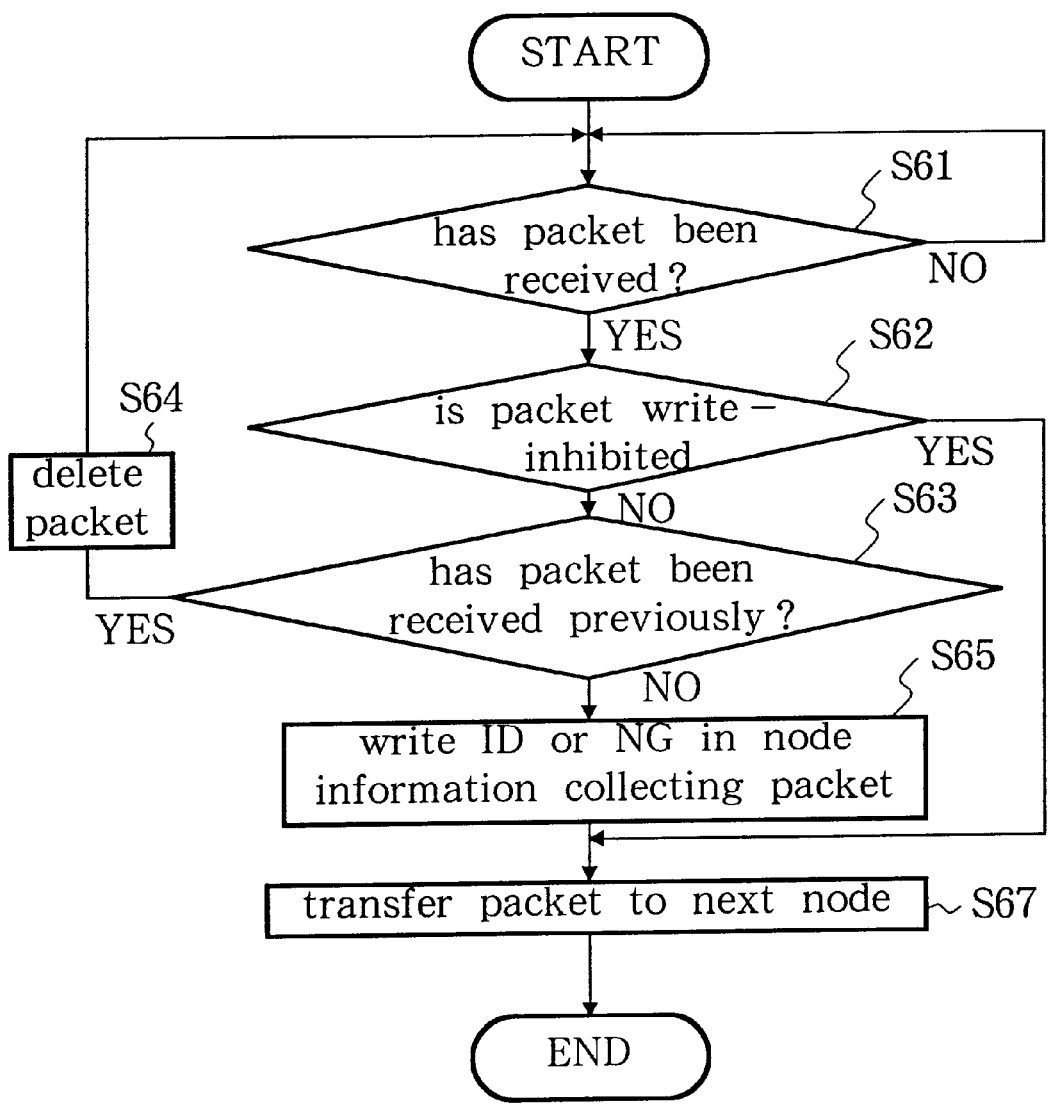
FIG. 31 shows the processing flow at an intermediate node.
Figure 32:
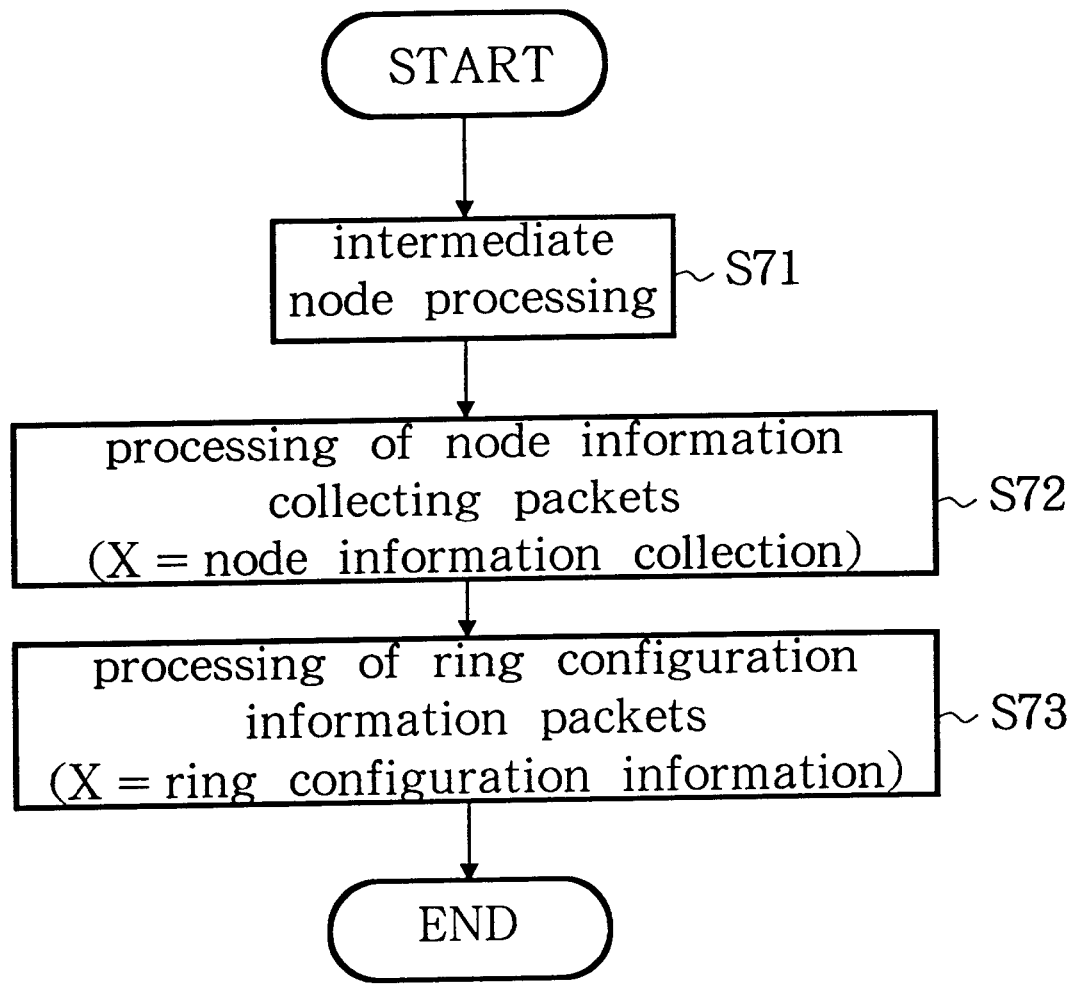
FIG. 32 shows the processing flow at a bridge node.
Figure 33:
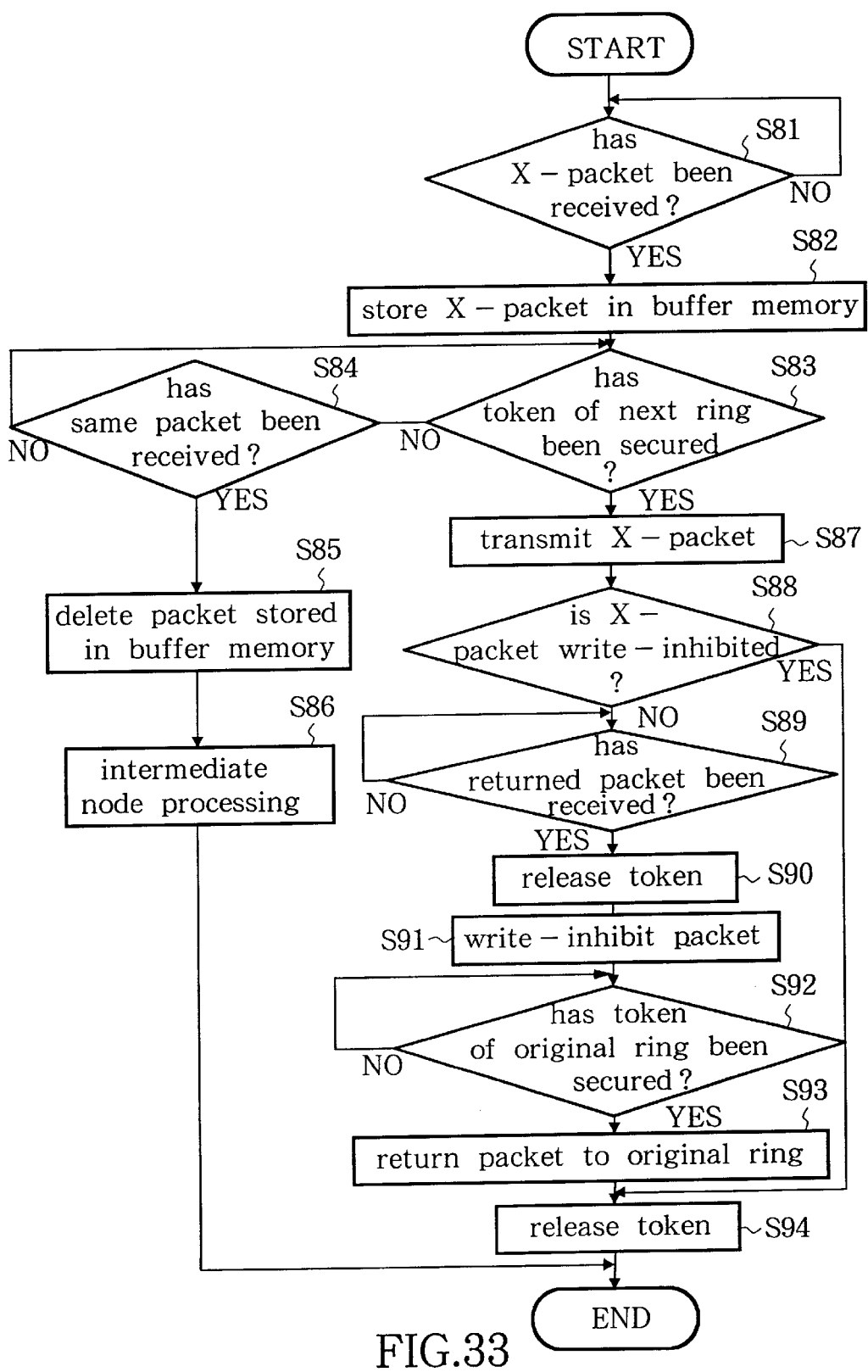
FIG. 33 shows the packet processing flow in the processing shown in FIG. 32.

FIG. 30 to FIG. 33 show the processing flow, at each type of node, for collecting and recognizing information relating to network configuration of node deployment and node condition. FIG. 30 shows the processing flow at a source node which wants to collect information relating to network configuration of node deployment and condition of the nodes. FIG. 31 shows the processing flow at an intermediate node, FIG. 32 shows the processing flow at a bridge node, and FIG. 33 shows the packet processing flow in the processing shown in FIG. 32. These processings are performed by means of path data collector 10 and controller 21 in the configuration shown in FIG. 4.

When a source node seizes the token circulating within the ring to which the node belongs (S51), it transmits a "node information collecting packet" (S52). This node information collecting packet has, in its data field section which is used for a conventional token ring protocol, an area in which each node can place its stamp. The address of the destination node is set as the source node address. After the source node has sent a "node information collecting packet", it stores all the packets it receives (S55). Note that when it receives the first packet after this has circulated around the ring, the node releases the token (S54).

Nodes other than the source node operate as intermediate nodes when they receive a "node information collecting packet" (S61). First of all, they check whether or not the received packet is write-inhibited (S62). If it is, the packet is transferred to an adjacent node. If the received packet is the same as a previously received one (S63), it is deleted (S64). If the packet has not been received before and the node receiving the packet is normal, the node writes its own ID in the stamp area and sends the packet on. If the packet has not been received before and a failure has occurred somewhere in the node receiving the packet, the node writes NG in the stamp area, and sends the packet on. The ID of a node contains a ring number as well as the actual node number. For example, four bits of the byte can be used as the ring number and the other four bits can be used as the number of the node within that ring.

The processing performed by a bridge node can be broadly divided into three types. The first is processing as an intermediate node (S71). The second is the processing of "node information collecting packets" as a bridge (S72). The third is the processing of "ring configuration information packets" (S73). A "ring configuration information packet" is a write-inhibited information notification packet. In FIG. 33, "node information collecting packets" and "ring configuration information packets" are collectively termed "X packets".

After a bridge node has performed the processing required by an intermediate node, it enters the mode for processing "node information collecting packets". If it receives a "node information collecting packet" from a source node (S81), it stores the packet in memory (S82) so that it can be passed on to the next ring. It then enters the mode for waiting for a token of the next ring (S83). When it secures a token, it transmits the "node information collecting packet" (S87). If it receives the same "node information collecting packet" from another bridge before securing a token (S84), it immediately deletes the packet stored in its memory (S85) and enters the processing mode of an intermediate node (S86). As a result, because only one "node information collecting packet" is transmitted from each bridge in a ring, congestion by control packets can be avoided. Next, the bridge node enters the mode for receiving packets which it itself has previously forwarded (and which are now filled with information). When it receives such packets (S89, S90), it write-inhibits them (S91) and returns them all to the original ring by the same route. If it receives a packet that has already been write-inhibited (S88), it returns that packet to the ring which transmitted it, whereupon the processing is finished.

By means of these operations, a source node can collect and recognize information on the network configuration of node deployment and condition of all nodes. After all this information has been stored (S53–S55) (and if processing time is greater than T (S56)) the source node sends out "ring configuration information packets" in a similar manner (S57, S58). The intermediate nodes receive these and any packet which has previously been received is deleted (S63, S64). Note that the "ring configuration information packets" are write-inhibited. Bridge nodes transfer these packets in a similar manner and store the information contained in them. Intermediate nodes and bridge nodes both finish the node information collecting process at the stage at which they have received and forwarded a "ring configuration information packet". The source node finishes the node information collecting process and releases the token at the stage at which it has received the "ring configuration information" (S59, S60).

The optimum path between any two nodes is set up on the basis of node information collected in this manner.

Figure 34:
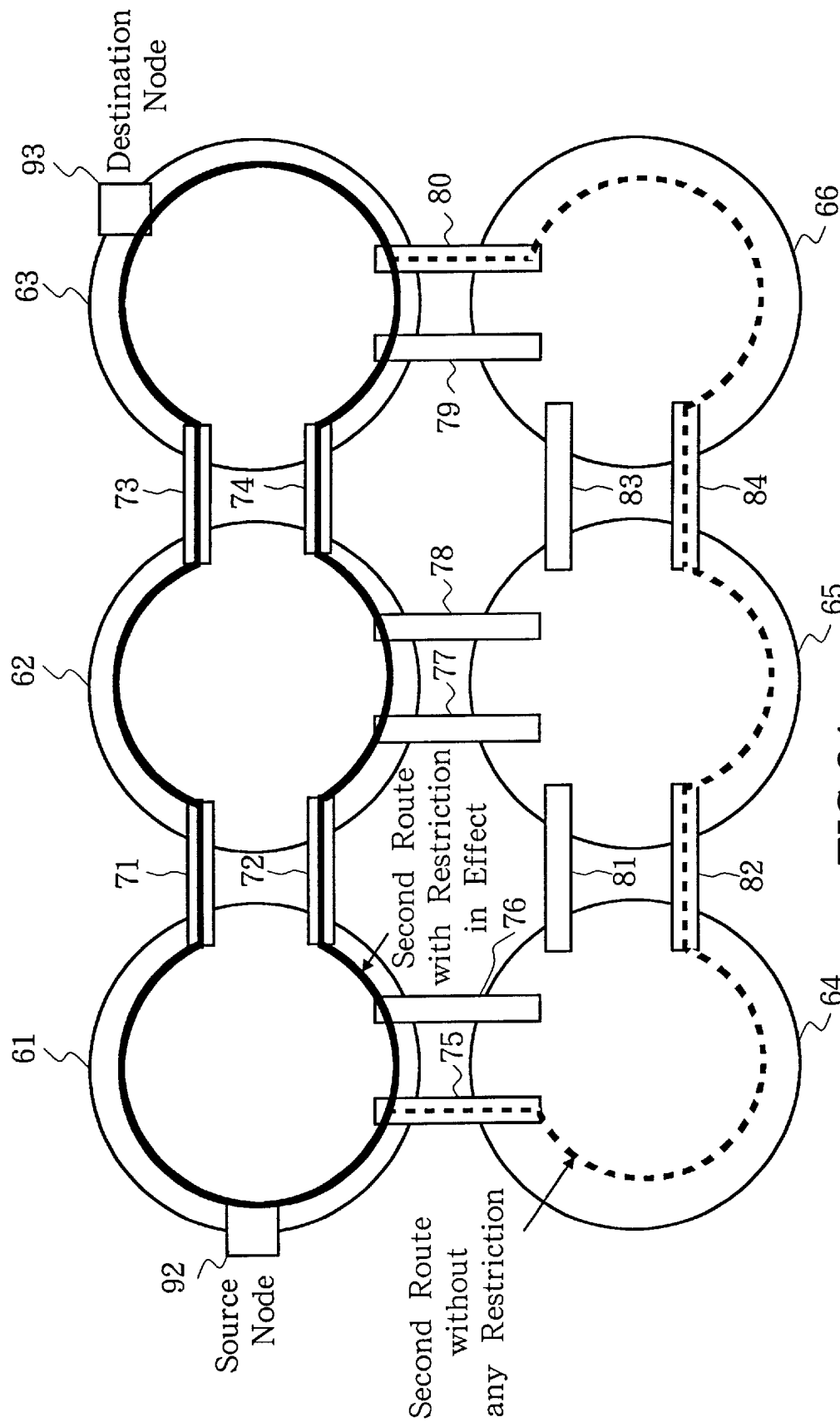
FIG. 34 shows an example of path setup.

FIG. 34 shows an example in which a path has been set up in the multiple-ring transmission facility shown in FIG. 29. In the example shown here, a double path has been set up between source node 92 in ring network 61 and destination node 93 in ring network 63. (Note that the term "source node" used here means a transmitting source at path setup, and is different from a source node for purposes of node information collection, as described above.) Some of the references cited above considered the case where double paths are routed through the same ring networks, but no consideration was given to a case where there is a possibility of setting up paths which are routed through different ring networks. Accordingly, FIG. 34 illustrates a case where, in the multiple-ring transmission facility shown in FIG. 29, one of the routes of the double path from source node 92 of ring network 61 to destination node 93 of ring network 63 is set up via ring network 62, while the other is set up via ring networks 64, 65 and 66. This situation results in large differences in the delay between the two routes. This is because it is always the bridge node which a packet first encounters which transfers the path to the next ring network. When there is a large difference in delay between two routes, a large buffer will be required to ensure that the path can be switched hitlessly.

To solve this problem, restrictions have to be placed on which rings each bridge node can transfer the path to. In other words, the set of ring networks through which paths from ring network 61 to ring network 63 pass has to be uniquely determined, and each bridge node has to get this information.

Information which has been collected by "node information collecting packets" should therefore be distributed by "ring configuration information packets" from source node 91, which constituted the transmitting source of the "node information collecting packets", to bridge nodes 71 to 84 of ring networks 61 to 66, and if required, to each node. On the basis of this distributed information, each bridge node 71 to 84 places a restriction on path setup by way of itself. In the example shown in FIG. 34, bridge node 75 places a restriction on path setup between source node 92 and destination node 93. As a result, if a class A path is to be set up between source node 92 and destination node 93, the path for the second route can be set up via ring network 62, thereby obtaining a double path with little delay difference. This enables the size of the buffer required in destination node 93 to perform hitless switching to be reduced.

Figure 35:
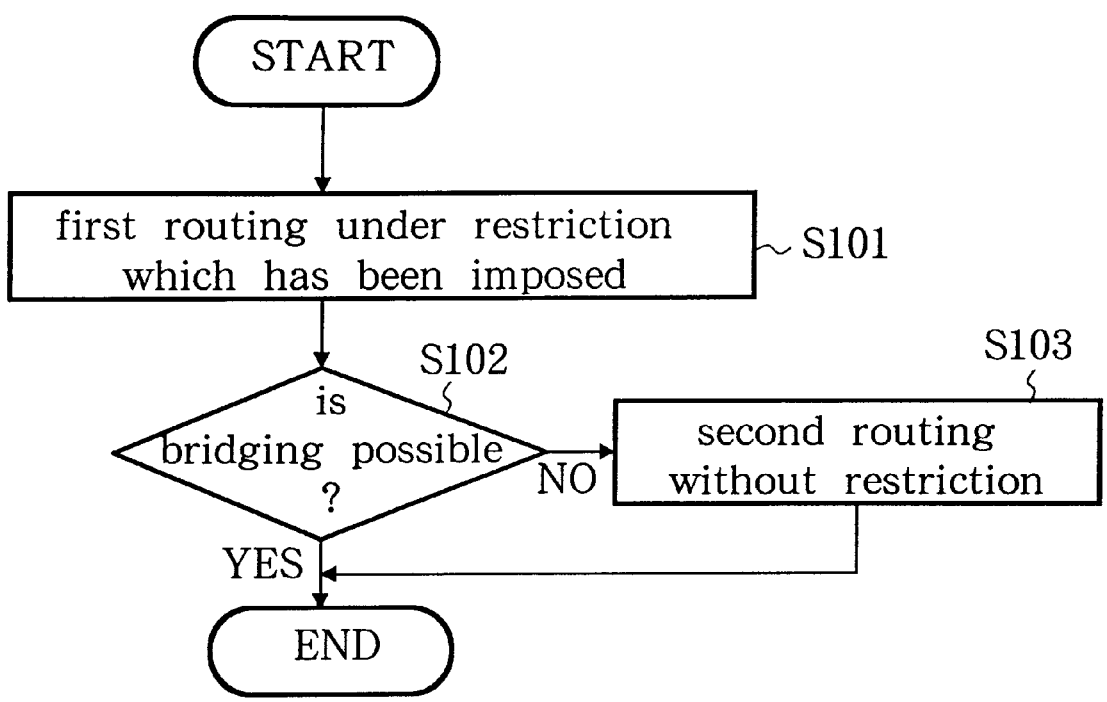
FIG. 35 shows the processing flow for routing by a bridge node.

FIG. 35 shows the processing flow for routing by a bridge node. Bridge nodes first of all perform routing under any restriction that has been imposed (S101). For example, although the routes through which a class A path passes are completely different, it is arranged for the ring networks through which they pass to be exactly the same, and for the routes joining the ring networks to be uniquely determined. The route decision is simple because the number of rings is much smaller than the number of nodes. If path setup under this sort of restriction is possible (S102), this completes the routing of the paths. In this case it is easy to achieve hitless switching and a path of the highest reliability is obtained. If path setup under restriction is impossible, the restriction is removed and re-routing carried out (S103). In this case, although it is difficult to achieve a hitlessly switchable path, a high reliability path can still be obtained. On the whole, therefore, buffer size can be reduced.

As has been explained above, the present invention provides a trunk transmission network which ensures that important information can always be successfully transferred to its destination node, and that information where the main concern is economy can be sent very cheaply. This is achieved by providing just three classes of path between nodes of interest, namely: class A paths which involve setting up a first route and a second completely diverse route so that in the event of a failure, the information in the path can be hitlessly switched; class B paths in which, in the event of a failure, path information flow is restored by searching for a new route for the path; and class C paths where information in the path at the time of a failure is not recovered, and any subsequent restoration depends on repair of equipment.

Furthermore, by managing paths between nodes using only three classes of high-capacity path, the number of paths to be managed in a trunk transmission network can be reduced and the burden on the operating system can be eased.

In addition, high reliability and survivability with easy path restoration in the event of a failure can be guaranteed for a trunk transmission network by connecting a plurality of nodes in a ring, arranging a plurality of these ring-shaped networks in a plane, and connecting them to each other at two or more nodes. Moreover, the following effects are obtained by basing a trunk transmission network on a ring topology, namely: the direction of a path is restricted to being either clockwise or counter-clockwise; routing for path setup and re-routing for path restoration when a failure has occurred can be simplified; the scale of the hardware and complexity of the algorithms required for route compilation can be reduced; and an economical trunk transmission network can be constructed.

Previously, a centralized operating system and connection equipment for connecting each node to this operating system were required. With the present invention, however, these can be dispensed with by providing each node with control means for control communication directly with other nodes. Then, when a path is being set up, the node at which the path setup request has occurred successively selects and sets a route to the destination node by accessing each node directly and confirming whether it has spare capacity, and not by using a centralized operating system. In addition, when setting up the path, the node selects the route while finding out whether a path is already accommodated at the other nodes. The previous technology, in addition, obviates the need for a huge database for designing where paths could be accomodated. It also obviates the need for a route selection tool based on this huge database. The present invention therefore provides an economical trunk transmission network.

The present invention also provides a more economical trunk transmission network by enabling the load on the operating system to be reduced. This is achieved by the following means. Firstly, the routing algorithm described above is used to route a diversely routed first route and second route, which together comprise a class A path, around a ring separately and in such manner that one is routed clockwise and the other is routed counter-clockwise, and at the two nodes which inter-connect rings, the clockwise route is connected in the clockwise direction and the counter-clockwise route is connected in the counter-clockwise direction, so that the first and second routes do not intersect. Secondly, when a failure has occurred on a class B path, the path is restored by using the routing algorithm described above to set the path up again in a route which avoids the failed link or node. In other words, instead of separately designing a routing algorithm for use in normal conditions and a path recovery algorithm for self-healing, as in the prior art, the routing algorithm can be used both for normal conditions and for path restoration after a failure.

The present invention is therefore capable of setting up paths with a plurality of transport functions. Namely, for information requiring high-reliability transmission, it can set up a path capable of transmitting the information without dropping any bits in the event of a failure, while information that does not require such reliability can be transmitted economically. The present invention also makes it easy to construct a ring topology network capable of guaranteeing high reliability and survivability.

Automatic network operation invariably requires learning the network configuration of node deployment and conditions of network nodes, and in the present invention this is implemented under distributed control. As a result, the present invention can provide simple and high-speed network management, node condition management, and route diversity with little delay variation, and obviates the need to have a plurality of control packets, which has previously been a potential problem in distributed control.

The foregoing describes specific representative embodiments modifications of which will occur to those of ordinary skill in the art and which are included in the scope of the invention defined by the following claims.

What is claimed is:

1. A trunk transmission network comprising:
   a plurality of nodes connected via physical transmission lines;
   a plurality of paths for transmitting information signals being set up on said physical transmission lines between said nodes;
   for an information signal which is to be transmitted from one of the plurality of nodes termed a source node to another of the plurality of nodes termed a destination node, each path connects the source node and the destination node either directly or via other nodes;
   said paths which are between source and destination node pairs being set up on the basis of pre-classification into higher service class paths in which any loss of information occurring in that path is restored, and lower service class paths which permit loss of information to occur in the path; and
   each node including means which, when that node is a source node, recognizes the service class of the information signal to be sent to the destination node and sets up a path corresponding to that service class to thereby provide distributed control of path setup.

2. A trunk transmission network according to claim 1, wherein:
   the higher service class is further divided into a highest class and a middle class;
   said highest class path employs complete diversity routing wherein a plurality of different routes are set up for that path;
   said middle class path can be re-routed around the location of a failure when said failure has occurred in a portion of the route traversed by the path; and
   said lower service class path is not alternatively routed when a failure has occurred in the route traversed by the path.

3. A trunk transmission network comprising:
   a plurality of nodes connected via physical transmission lines;
   a plurality of paths for transmitting information signals being set up on said physical transmission lines between said nodes;
   for an information signal which is to be transmitted from one of the plurality of nodes termed a source node to another of the plurality of nodes termed a destination node, each path connects the source node and the destination node either directly or via other nodes;
   said paths which are between source and destination node pairs being set up on the basis of pre-classification into higher service class paths in which any loss of information occurring in that path is restored, and lower service class paths which permit loss of information to occur in the path; and
   each node including means which, when that node is a source node, recognizes the service class of the information signal to be sent to the destination node and sets up a path corresponding to that service class;
   wherein each of at least some of the plurality of nodes has a distributed path setup means which sets up paths prior to transmission of an information signal by using a control channel to exchange control signals with other nodes to thereby provide distributed control of path set up.

4. A trunk transmission network according to claim 3, wherein the distributed path setup means selects a route, in accordance with a required service class, from among the plurality of routes which can connect the source and destination nodes, and then successively sets up a path along the selected route, starting from the source node.

5. A trunk transmission network according to claim 3, wherein:
   said higher service class is further divided into a highest class and a middle class;
   the physical transmission lines are in the form of a plurality of ring networks connected together, each ring network comprising at least two nodes connected in a ring;
   each said ring network is connected to another ring network by means of some of network nodes acting as bridge nodes; and
   the distributed path setup means includes means which, for the highest class path, sets up two paths in mutually opposite directions around each said ring network through which the highest class path passes; and which, for the middle class path and the lower service class path, sets up a path in one direction around each said ring network.

6. A trunk transmission network according to claim 5, wherein each node has means for hitlessly selecting the better quality route of the highest quality path comprising two routes for which that node is the destination node.

7. A trunk transmission network according to claim 5, wherein the path setup means includes means for automatically restoring the middle service class path by re-routing in the event of a failure.

8. A trunk transmission network according to claim 7, wherein the restoration means includes means for looping back a token contained in the control channel when a node has detected a failure in an adjacent link or node.

9. A trunk transmission network according to claim 5, wherein:
   each said ring network is connected to another ring network via at least two bridge nodes;
   at least one node of any of the ring networks comprises means for transmitting, in one direction around the ring network to which that node belongs, a node information collecting packet for collecting information relating to the network configuration of node deployment and operating state of the nodes in that ring network and in another of said ring networks; and means which terminates a node information collecting packet which has returned to that node which originally transmitted it, and which stores the information collected by that node information collecting packet;
   each node of each ring network comprises means which writes its node ID and state in a received node information collecting packet and transfers the packet to the next node; and
   each node used as a bridge node comprises, in addition to the node information collecting packet writing and transfer means;

means for temporarily storing a node information collecting packet received from one of two ring networks mutually connected by the bridge node; means which, when a right to transmit to another of the two ring networks has been received, transfers to said another ring network the node information collecting packet stored in the temporary storage means;

means which deletes the node information collecting packet stored in the temporary storage means if a node information collecting packet from another bridge node has been received but no transmitting right has been obtained; and means for terminating a node information collecting packet which has returned to the bridge node which originally transferred it, and for write inhibiting that node information collecting packet and returning it to the original ring network.

10. A trunk transmission network according to claim 9, wherein each said node of each said ring network, including the bridge nodes, comprises means which, if it receives the same node information collecting packet within a predefined time, deletes the same node information collecting packet.

11. A trunk transmission network comprising:

a plurality of nodes connected via physical transmission lines;

a plurality of paths for transmitting information signals being set up on said physical transmission lines between said nodes;

for an information signal which is to be transmitted from one of the plurality of nodes termed a source node to another of the plurality of nodes termed a destination node, each path connects the source node and the destination node either directly or via other nodes;

said paths which are between source and destination node pairs being set up on the basis of pre-classification into higher service class paths in which any loss of information occurring in that path is restored, and lower service class paths which permit loss of information to occur in the path; and each said node including means which, when that node is a source node, recognizes the service class of the information signal to be sent to the destination node and sets up a path corresponding to that service class;

wherein: the higher service class is further divided into a highest class and a middle class;

a highest class path employs complete diversity routing wherein a plurality of different routes are set up for that path;

a middle class path can be re-routed around the location of a failure when said failure has occurred in a portion of the route traversed by the path;

said lower service class path is not alternatively routed when a failure has occurred in the route traversed by the path, said higher service class is further divided into a highest class and a middle class;

the physical transmission lines are in the form of a plurality of ring networks connected together, each ring network comprising at least two nodes connected in a each said ring network is connected to another ring network by means of some of network nodes acting as bridge nodes; and the distributed path setup means includes means which, for the highest class path, sets up two paths in mutually opposite directions around each said ring network through which the highest class path passes; and which, for the middle class path and the lower service class path, sets up a path in one direction around each said ring network;

wherein distributed path setup means comprises:

means which, when the node is a source node, gets a token that is circulating around the ring network to which that node belongs, and then sends path setup request packets in two mutually opposite directions;

means which, when the node is a bridge node, transfers the path setup request packet that has arrived in one direction to another ring network in the same direction; and means which, when the node is a destination node and the packets received from the two directions request setup of the highest class path, sends back a response to these packets in two mutually opposite directions, and when the packets received from the two directions request setup of the middle class path or the lower service class path, sends back a response to one of these packets in one direction only.

12. A trunk transmission network according to claim 11, wherein each node has means for hitlessly selecting the better quality route of the highest quality path comprising two routes for which that node is the destination node.

13. A trunk transmission network according to claim 11, wherein the path setup means includes means for automatically restoring the middle service class path by re-routing in the event of a failure.

14. A trunk transmission network according to claim 13, wherein the restoration means includes means for looping back a token contained in the control channel when a node has detected a failure in an adjacent link or node.

15. A node for transmitting information signals via paths set up in advance in physical transmission lines in a trunk transmission network, comprising:

means which, for the transmission of an information signal from that node as a source node, recognizes whether a service class of the information signal to be transmitted is a higher service class for which any loss of information in one of the paths is restored, or a lower service class which permits loss of information in one of the paths, and sets up a path corresponding to that service class.

16. A node according to claim 15, wherein the means for selecting a path includes means which further divides the higher service class into a highest class and a middle class; and which, for an information signal of the highest class, selects a path comprising a double route; and, for an information signal of the middle class, selects a path in one direction which can detour around the location of a failure when a failure has occurred in said portion of the route; and, for an information signal of a lower service class, selects a path in one direction, which is not alternatively routed when a failure occurs in that route.

17. A node according to claim 15, wherein said node includes a distributed path setup means which sets up said paths prior to transmission of an information signal by using a control channel to exchange control signals with other nodes.

* * * * *